US012377562B2

(12) United States Patent
Rhodes

(10) Patent No.: US 12,377,562 B2
(45) Date of Patent: Aug. 5, 2025

(54) LAMP MODULE FOR DETACHABLE ATTACHMENT TO SHAVING RAZOR

(71) Applicant: Kazoo, LLC, Charleston, SC (US)

(72) Inventor: Jamie McKala Rhodes, Charleston, SC (US)

(73) Assignee: Kazoo, LLC, Charleston, SC (US)

( * ) Notice: Subject to any disclaimer, the term of this patent is extended or adjusted under 35 U.S.C. 154(b) by 0 days.

(21) Appl. No.: 18/394,126

(22) Filed: Dec. 22, 2023

(65) Prior Publication Data

US 2024/0208094 A1 Jun. 27, 2024

Related U.S. Application Data

(60) Provisional application No. 63/516,347, filed on Jul. 28, 2023, provisional application No. 63/476,871, filed on Dec. 22, 2022.

(51) Int. Cl.

| | |
|---|---|
| ***B26B 21/46*** | (2006.01) |
| ***F21L 4/00*** | (2006.01) |
| ***F21V 21/088*** | (2006.01) |
| ***F21V 33/00*** | (2006.01) |
| *B26B 21/22* | (2006.01) |
| *F21Y 115/10* | (2016.01) |

(52) U.S. Cl.

CPC .............. *B26B 21/46* (2013.01); *F21L 4/005* (2013.01); *F21V 21/0885* (2013.01); *F21V 33/0084* (2013.01); *B26B 21/22* (2013.01); *F21Y 2115/10* (2016.08)

(58) Field of Classification Search

CPC ......... B26B 21/46; B26B 19/46; B26B 21/22; F21V 33/0084; F21V 21/088

See application file for complete search history.

(56) References Cited

U.S. PATENT DOCUMENTS

| | | | | |
|---|---|---|---|---|
| 1,168,288 A * | 1/1916 | Davidson | B26B 19/46 362/115 |
| 1,223,305 A * | 4/1917 | Allport | B26B 19/46 362/396 |
| 1,258,058 A | 3/1918 | Stuefer | |
| 1,429,760 A | 9/1922 | Norquist | |

(Continued)

FOREIGN PATENT DOCUMENTS

| | | |
|---|---|---|
| DE | 202022102321 U1 | 5/2022 |
| KR | 101061695 B1 | 9/2011 |
| KR | 102121312 B1 | 6/2020 |

OTHER PUBLICATIONS

Re-Filing: Krovena, Krovena Detachable Head Electric Razor for Women, accessed Oct. 27, 2022, https://www.dontwasteyourmoney.com/products/krovena-detachable-head-electric-razor-for-women, 1 page.

*Primary Examiner* — Ismael Negron

(74) *Attorney, Agent, or Firm* — Thompson Patent Law Offices PC

(57) ABSTRACT

The light module includes a light element coupled to at least one position module. The position modules are configured to releasably couple to a stem of a razor. The position modules allows the light element to project light along an optical axis intersecting a longitudinal axis of the stem of the razor such that, during a shaving operation, the light projected from the light element illuminates the shaving surface beyond the head of the razor.

17 Claims, 32 Drawing Sheets

(56) References Cited

U.S. PATENT DOCUMENTS

| | | | | | |
|---|---|---|---|---|---|
| 1,554,159 | A * | 9/1925 | Herman | B26B 19/46 | 362/115 |
| 1,676,183 | A * | 7/1928 | Garfunkle | B26B 21/46 | 362/115 |
| 2,195,423 | A * | 4/1940 | Powell | B26B 19/46 | 362/115 |
| 2,279,341 | A * | 4/1942 | Powell | B26B 19/46 | 307/157 |
| 2,595,287 | A * | 5/1952 | Perry | B26B 19/46 | 362/115 |
| 2,914,655 | A * | 11/1959 | Swift | B26B 19/46 | 362/115 |
| 4,473,943 | A | 10/1984 | Papanikolaou | | |
| 5,299,104 | A * | 3/1994 | Parmentier | B26B 21/46 | 362/558 |
| 5,943,809 | A * | 8/1999 | Ring | A01K 97/125 | 43/25 |
| 6,915,576 | B2 * | 7/2005 | Brzezinski | B26B 21/46 | 362/115 |
| 9,168,662 | B1 * | 10/2015 | Brown | B26B 21/46 | |
| 9,592,615 | B1 | 3/2017 | Broeske | | |
| 10,842,234 | B2 * | 11/2020 | Allan | B26B 19/46 | |
| 2005/0034307 | A1 | 7/2005 | Brzezinski | | |
| 2007/0271714 | A1 | 11/2007 | Adam et al. | | |
| 2008/0010834 | A1 | 1/2008 | Oglesby et al. | | |
| 2008/0028616 | A1 | 2/2008 | Kwak | | |
| 2017/0326744 | A1 | 11/2017 | Liberatore et al. | | |
| 2018/0326605 | A1 | 11/2018 | Khubani et al. | | |

* cited by examiner

LAMP MODULE FOR DETACHABLE ATTACHMENT TO SHAVING RAZOR

CROSS-REFERENCE TO RELATED APPLICATIONS

This application claims the benefit of U.S. Provisional Application Ser. No. 63/476,871, titled "DETACHABLE SHAVING LIGHT," filed by Jamie McKala Rhodes on Dec. 22, 2022.

This application claims the benefit of U.S. Provisional Application Ser. No. 63/516,347, titled "DETACHABLE SHAVING LIGHT," filed by Jamie McKala Rhodes on Jul. 28, 2023.

This application incorporates the entire contents of the foregoing application herein by reference.

TECHNICAL FIELD

Various embodiments relate generally to personal care and grooming.

BACKGROUND

Razors and razor blades, tracing back to ancient civilizations, initially utilized sharpened shells, flint, and later metals like bronze and iron. Modern advancements have ushered in materials like stainless steel and ceramics for sharper, more durable blades. Their evolution also reflects cultural shifts in grooming standards and aesthetics across eras. Furthermore, the art of shaving and blade craftsmanship has led to a subculture of enthusiasts and collectors.

Razors have seen continuous improvement, from the traditional straight razors to safety razors, and now to cartridge-based systems. Innovations encompass multi-blade configurations for a closer shave, pivot heads for contour adjustments, and lubrication strips for enhanced glide and skin protection. Ergonomic handle designs have improved grip and maneuverability, ensuring a safer shave. The modern market also witnesses eco-friendly options, emphasizing sustainable materials and designs.

Light emitting devices, starting from rudimentary lamps, have transitioned to the discovery and implementation of electroluminescence. Modern light emitting diodes (LEDs) operate by electroluminescent principles, where semiconductors release photons when energized. LEDs have seen vast improvements in luminous efficacy, color spectrum, and lifespan, finding applications in displays, medical equipment, and high-efficiency lighting, among others.

SUMMARY

Apparatus and associated methods relate to a detachable light shaving module. In an illustrative example, the detachable light shaving module includes a light element coupled to at least one position module. The position modules are configured to releasably couple to a stem of a razor. The placement of the position modules allow the light element emitted along from the light element to align along an optical axis. The optical axis may intersect a longitudinal axis of the stem of the razor. For example, during a shaving operation the light projected from the light element onto the shaving surface may intersect the longitudinal axis of the stem of the razor beyond the head of the razor.

Various embodiments may achieve one or more advantages. For example, some embodiments may illuminate the hair follicles while shaving a user's legs. Some embodiments may, for example, illuminate the hair follicles while shaving a user's arm pits. Some embodiments may, for example, illuminate a user's chin to shave their face in the dark while looking into a mirror. Embodiments may, for example, highlight stray hair follicles that have not been shaved. Embodiments may, for example, allow a user to detect different type of hair follicles, such as dark hair follicles, blond hair follicles, ginger hair follicles, thick hair follicles, thin hair follicles, short hair follicles, long hair follicles, and/or hard to detect hair follicles. A user may, for example, examine the hair follicles to determine whether a user has a achieved a proper shave by eliminating all hair follicles.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce a discussion of various embodiments, an exemplary use case scenario is introduced concerning FIGS. 1A-1B. Second, that introduction leads into a description concerning FIGS. 2A-14 of some exemplary embodiments. Third, concerning FIG. 3, an exemplary embodiment is described in FIGS. 15A-16H. Fourth, concerning FIGS. 17A-17D, the discussion turns to exemplary detachable light shaving light embodiment.

Figure 1A:
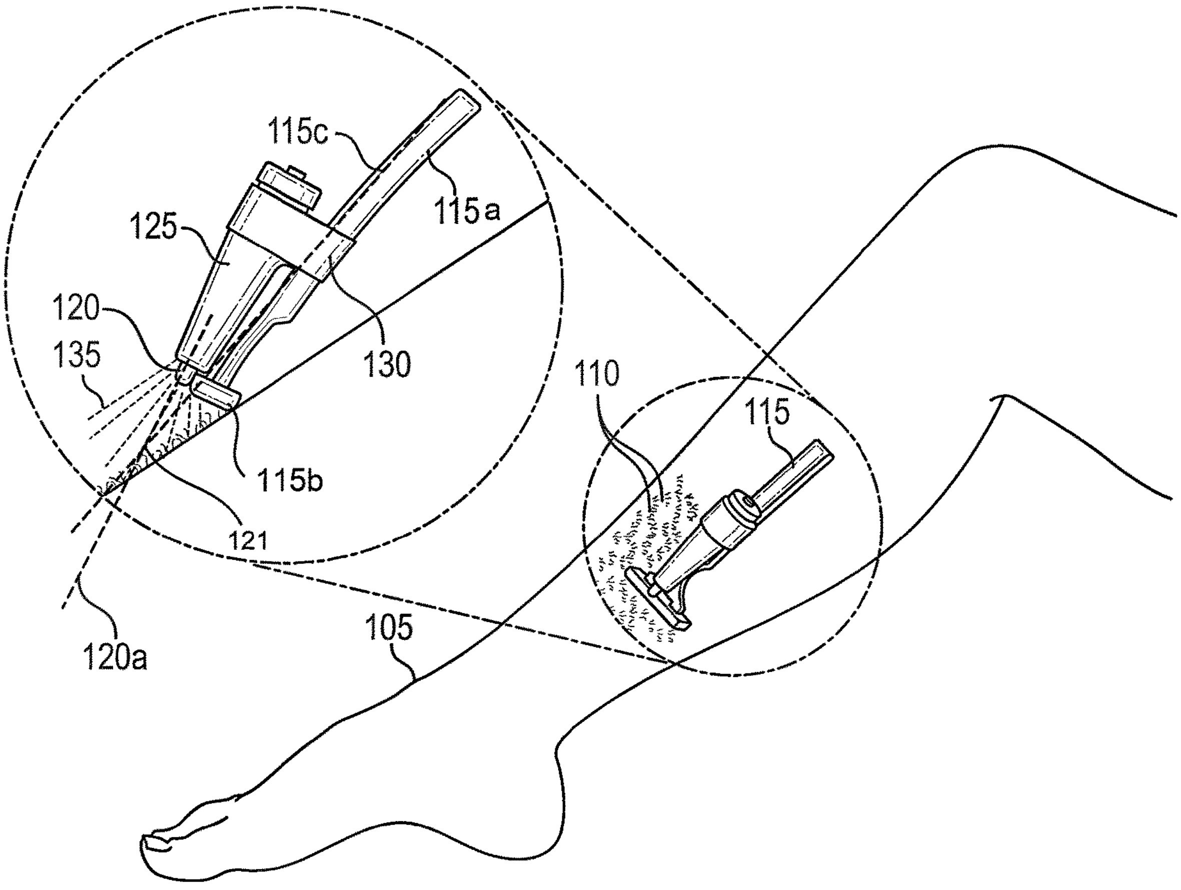
FIG. 1A depicts an exemplary detachable shaving light employed in an illustrative use-case scenario of a leg being shaved.

FIG. 1A depicts an exemplary detachable shaving light employed in an illustrative use-case scenario of a leg being shaved. The illustrative use-case scenario includes a surface of skin 105 of a leg. The surface of skin 105 includes hair follicles 110. The hair follicles are being shaved by a razor 115.

The illustrative use-case scenario includes an exploded view of the razor 115. The razor 115 includes a stem **115*a*. The razor includes a head 115*b*. The head of the razor may, for example, include razor blades. The head of the razor may, for example, be used to shave hair follicles. The razor 115** includes a longitudinal axis extending along the stem of the razor.

The illustrative use-case scenario includes a light shaving module 125. The light shaving module 125 houses a light element 120. A position module 130 is releasably coupled to the light shaving module 125. The position module includes two inserts. The position module 130 includes a first insert configured to releasably couple the light shaving module 125. The position module includes a second insert configured to releasably couple to the stem **115*a*** of the razor.

The light element 120 releases light 135. The light may, for example, illuminate the shaved part of the leg as a force is being used to drag the razor along unshaved parts of the leg.

The light element 120 releases light particles primarily along an optical axis **120*a*. Periphery light may, for example, be emitted from the light element. The optical axis 120*a* intersects at an intersection point 121 with the longitudinal direction of the stem 115*c*** of the razor. This may, for example, improve the light distribution of the razor. The intersection angle may, for example, range from 0 to 90 degrees. The intersection may, for example, advantageously allow a user to illuminate the hair follicles while shaving such that the user may determine the status of the shave. A user may, for example, detect missed hair follicles and redo shaving portions to shave a shaving surface until all the hair follicles detected are shaved off the shaving surface.

The position module may be configured to clip, snap, and/or hook over a razor handle. The position module may, for example, be configured to attach to a razor head. The base may be releasably coupled to a razor. For example, the position module may, for example, be configured to attach to a razor head. The coupling module may, for example, be configured to attach to the stem of the razor. In some implementations the position module may include at least one clip.

For example, the position modules may, for example, include two clips as shown in FIGS. 17A-17D. The coupling module may be spaced to allow adaptation of the position of the detachable shaving light. The adaptability of the position of the detachable light may, for example, allow a user to adapt the light to any curvature of any razor. The coupling modules may, for example, allow a user to readily attach a detachable shaving light to any razor in a short time. The detachable shaving light may by way of example and not limitation be coupled to a razor from start to finish in 5 seconds.

The base of the detachable shaving light may be curved. The curved body may, for example, allow a user to manipulate the light element to bypass any razor head. The curved body may be hollow as shown in FIGS. 17A-17D. The curved body may, for example, be created by coupling a left and right bisection together. The manufacture of a left and right part bisection in forming the detachable light may, for example, allow for more efficient manufacturing and mass production of the detachable shaving light. The manufacture may be more efficient, because the electronics may for example may be more efficiently inserted into the interior of the detachable shaving light.

In some implementations, the detachable shaving light may be sold as a kit. The kit may include various sized and shaped coupling modules. The kit may, for example, take into account different brands of disposable razors to mold appropriate coupling modules for sale.

In an attached mode, the position module supports the light shaving module in a position distal to the head of the razor (e.g., distal to the razor blades). The distal shaving module is positioned such that the housed light element shines on a shaved surface (e.g., skin, face, legs, armpit). Accordingly, the light source may illuminate a surface being shaved. The lighting of a shaving surface may, for example, advantageously aid a user in identifying hair follicles that were not shaved by the first shaving motion.

The position module may support the light shaving module at a predetermined angle relative to the head of the razor. For example, the base may extend in the first plane. The razor blades may define a cutting plane. The cutting plane may, for example, be at the skin's surface. The first plane may intersect with the cutting plane such that the base is held at an angle relative to the cutting surface configured, such that a user may see the surface that the razor blades have just cut. Accordingly, a user may advantageously visually identify any missed cutting surface.

In some embodiments, the light may be reconfigurable. For example, the coupling module may be flexible. The coupling module may support the lighting base proximal to the razor head in some embodiments. For example, the light may be angled to shine from the handle upwards toward the razor head to illuminate a surface about to be shaved.

In some embodiments, the coupling module may support the lighting base to the side of the razor head. For example, the light may shine on one or both sides of the razor head. The light shaving may have a power supply. For example, the power supply may include a battery. The battery may be attached to the base and/or to the coupling module. The battery may, for example, be rechargeable. The battery may, for example, be disposable. The light shaving module may be designed as a universal attachment for multiple razors. For example, the light may be reusable and attached to a disposable razor. The light shaving module may be removed and transferred from a first razor to a second razor.

Figure 1B:
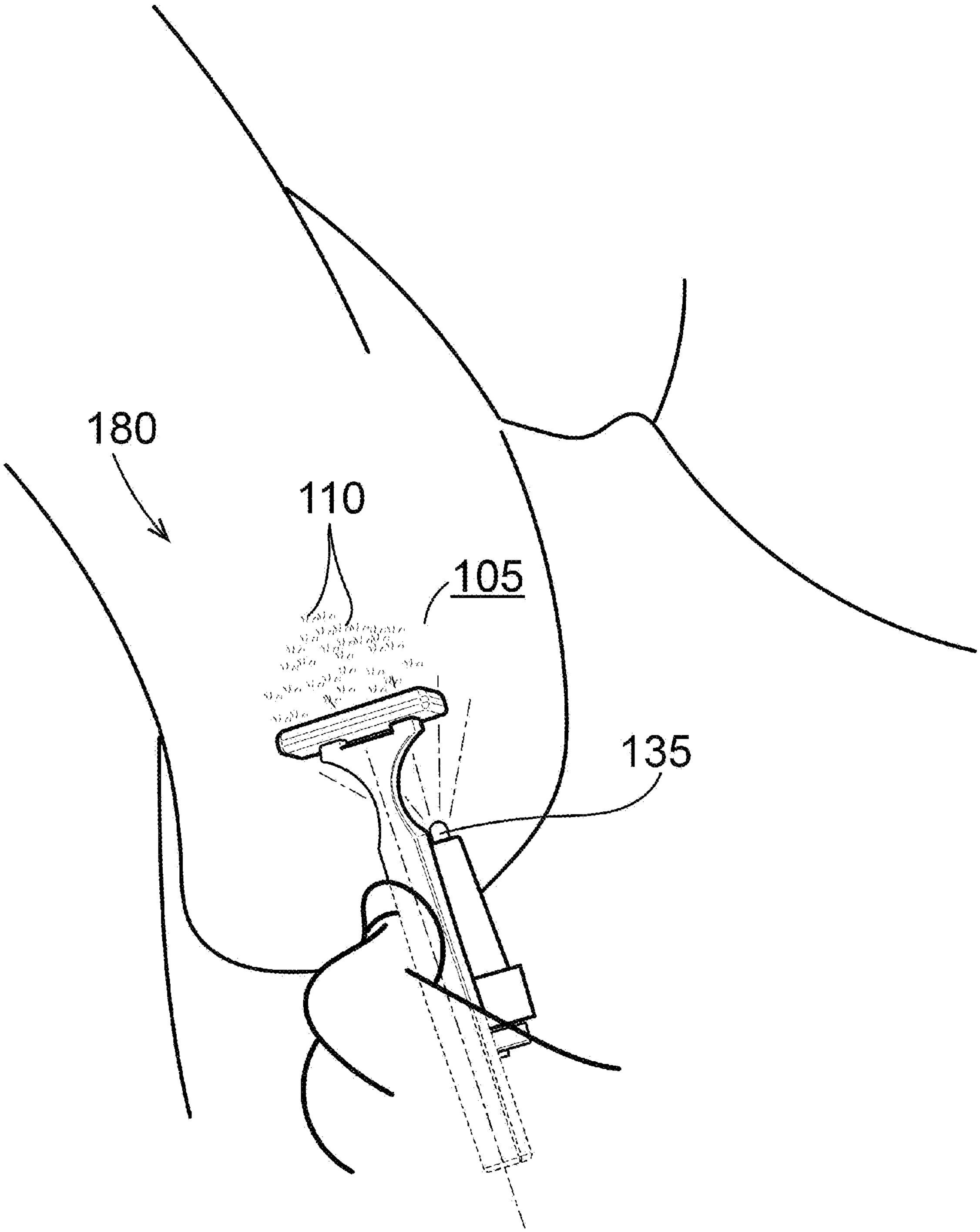
FIG. 1B depicts an exemplary detachable shaving light employed in an illustrative use-case scenario of an arm pit being shaved.

FIG. 1B depicts an illustrative use-case scenario 180. In the illustrative use-case scenario 180, a user is shaving a surface of skin 105 of an armpit. The surface of skin 105 includes hair follicles 110. The detachable light shaving device is releasably coupled by the position modules to be positioned below the razor. Light 135 is being emitted such that the light follows a primary path of an optical axis. The optical axis intersects the longitudinal direction of the stem of the razor. The light 135 emitted illuminates the hair follicles primarily, such that the user may identify them and shave them.

Figure 2A:
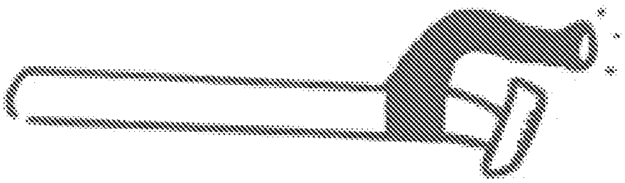
FIG. 2A depicts an exemplary detachable shaving light in a configuration mode releasably coupled to a proximal end of a razor.
Figure 2B:
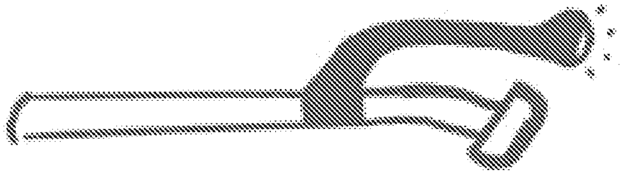
FIG. 2B depicts an exemplary detachable shaving light in a configuration mode releasably coupled to a mid-section of a razor.
Figure 2C:
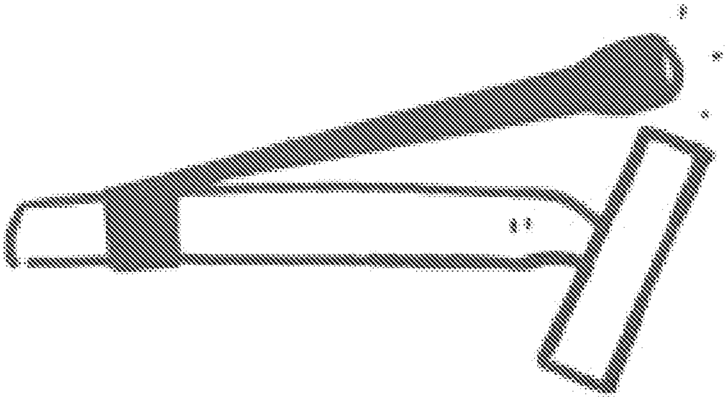
FIG. 2C depicts an exemplary detachable shaving light in a configuration mode releasably coupled to a distal end of a razor.

FIG. 2A-C are exemplary detachable shaving lights in different configuration modes attached to a razor. The light source may, for example, be attached as in FIG. 2A close to the head of the razor. The light source may, for example, be attached as in FIG. 2B in the middle of the stem. The light source may, for example, be attached as the distal end of the stem from the proximal head, as in FIG. 2C.

Figure 3:
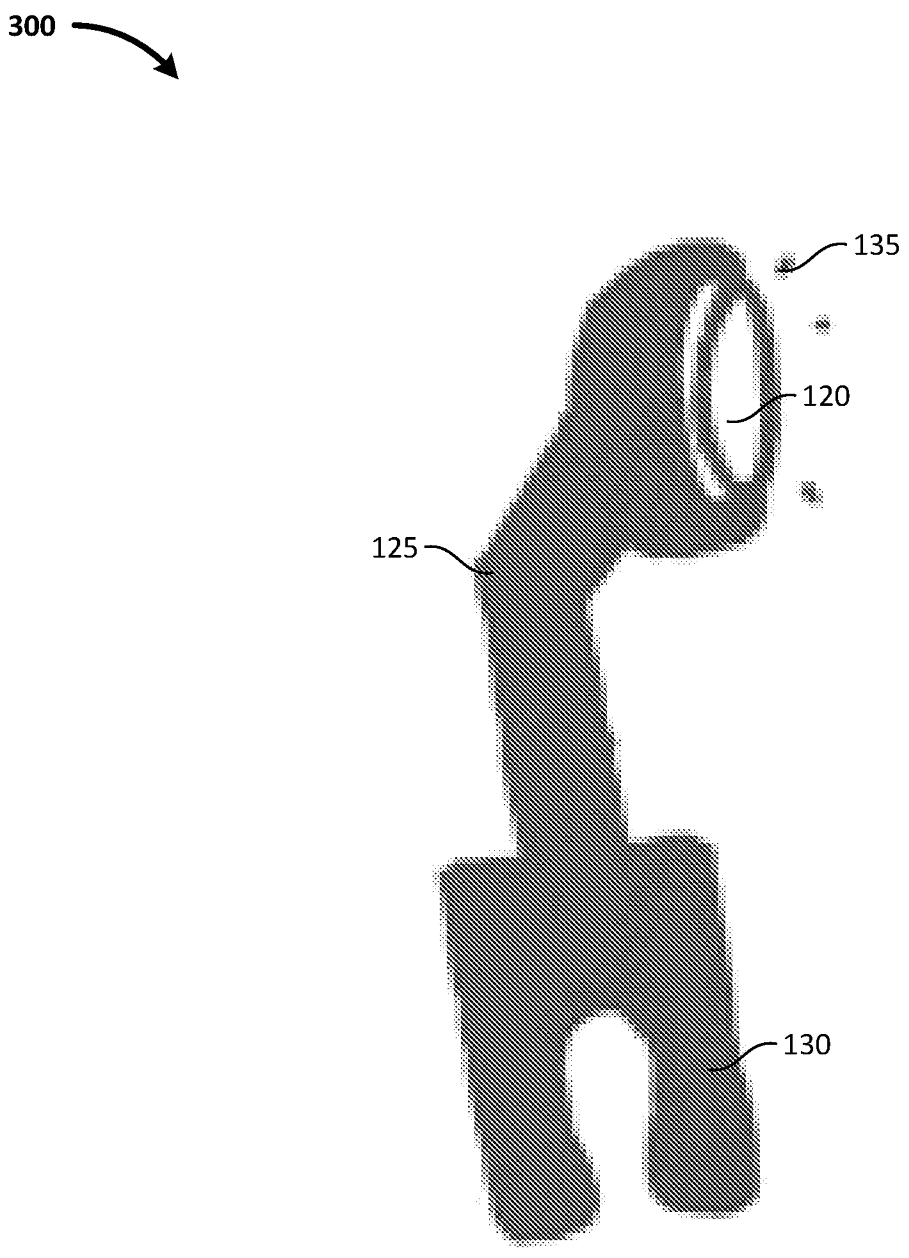
FIG. 3 depicts an exemplary detachable shaving light.

FIG. 3 is an exemplary detachable shaving light 300. The detachable shaving light may couple to various razors. The exemplary detachable shaving light 300 includes a light shaving module 325. The light shaving module 325 may, for example, be extendable. The light shaving module 325 may, for example, be flexible. The light shaving module 325 may, for example, be a cord. The exemplary detachable shaving light 300 includes a position module 330. The position module may, for example, be made of plastic, metal, elastic, and/or a polymer. The position module may, for example, elastically couple to the razor.

In some implementations, the position module may be rigid. In some implementations, the position module may be a switch to couple the light shaving module to the stem of the razor. The exemplary detachable shaving light 300 includes the at least one light source 320. The light source may, for example, include a closed-circuit system. The light source may, for example, include battery power. The light source power source may be rechargeable. The light source may be disposable and not include a charging function.

Figure 4:
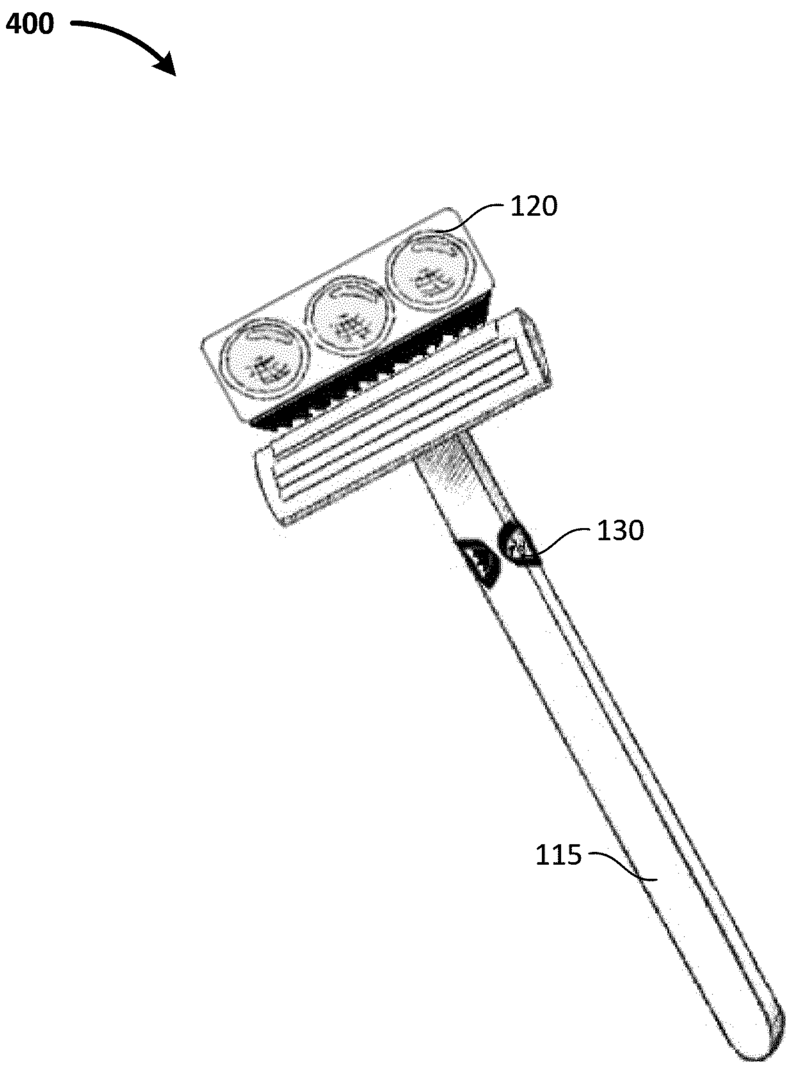
FIG. 4 depicts an exemplary embodiment of a detachable shaving light attached to a razor.

FIG. 4 is an exemplary detachable shaving light device 400. The exemplary detachable shaving light device includes a position module 130. The position module 130 is attached to the razor 115. The razor 115 may, for example, include disposable razors. The position module 130 couples to a light shaving module. The light shaving module houses the at least one light element 120.

In some embodiments, the light shaving module may position light elements near the razor head. In other embodiments, the light shaving module may position the light elements to intersect the longitudinal axis of the razor stem.

In some embodiments, the light elements may be independent of the razor head. The light elements may, for example, be held in place by the structural support of the light shaving module. The lights shaving may, for example, include a structural cord device.

Figure 5A:
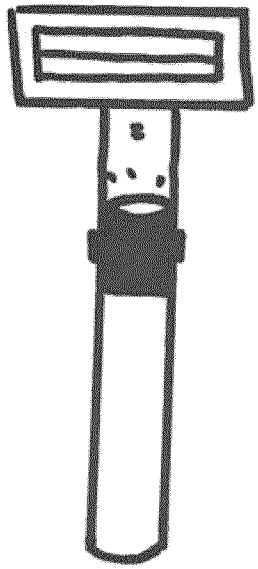
FIG. 5A depicts a front view of an exemplary embodiment of a detachable shaving light attached to a razor.
Figure 5B:
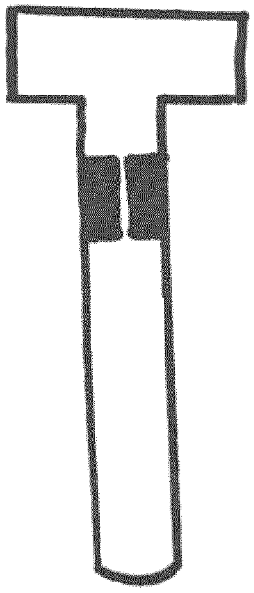
FIG. 5B depicts a back view of an exemplary embodiment of a detachable shaving light attached to a razor.

FIG. 5A-10B are exemplary embodiments of a detachable shaving light attached to a razor. In FIG. 5A, the detachable shaving light is positioned below the razor. The coupling module is shown to couple to the top of the base, as seen in FIG. 5B. In some other embodiments, the detachable shaving light may be positioned above the razor and be coupled to the stem from below the razor.

Figure 6A:
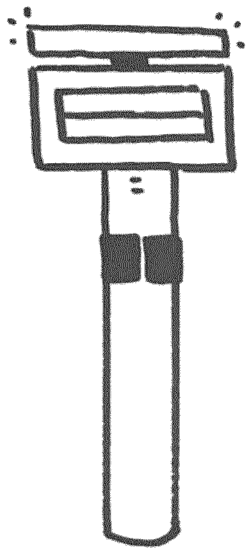
FIG. 6A depicts a front view of an exemplary embodiment of a detachable shaving light attached to a razor.
Figure 6B:
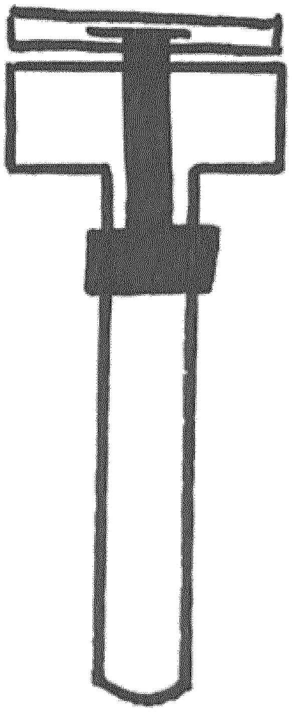
FIG. 6B depicts a back view of an exemplary embodiment of a detachable shaving light attached to a razor.

In FIG. 6A, the detachable shaving light is positioned on top of the razor. The coupler is attached to the stem proximal to the head of the razor. The light source is distal from the stem but proximal to the other side of the head of the razor. The light source provides lighting. The light source may be powered via batteries contained in the lighting device. FIG. 6B provides the opposite side view of FIG. 6A.

Figure 7A:
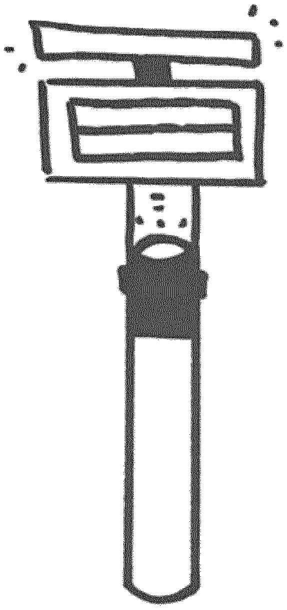
FIG. 7A depicts a front view of an exemplary embodiment of a detachable shaving light attached to a razor.
Figure 7B:
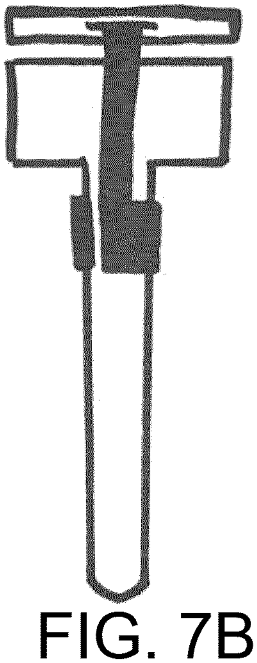
FIG. 7B depicts a back view of an exemplary embodiment of a detachable shaving light attached to a razor.

FIG. 7A depicts a light source attached to the bottom of the razor. The detachable razor light couples to the razor, as seen in FIG. 7B by coupling with a flexible clasp. The clasp may, for example, be made of plastic, rubber, metal, and or an elastomer.

Figure 8A:
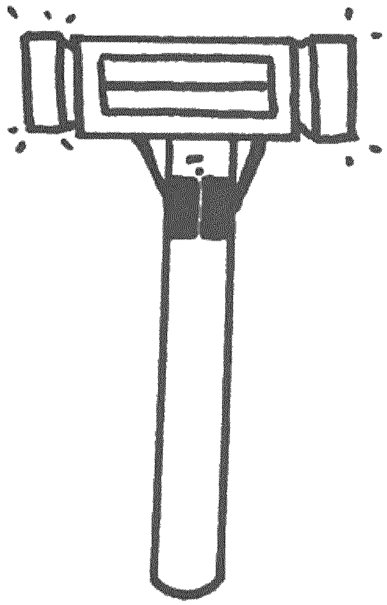
FIG. 8A depicts a front view of an exemplary embodiment of a detachable shaving light attached to a razor.
Figure 8B:
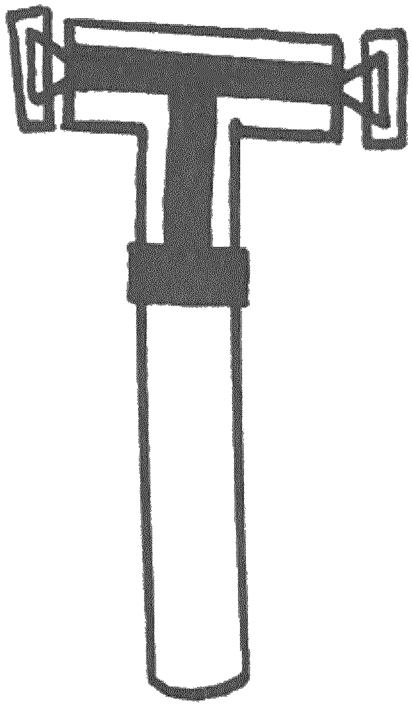
FIG. 8B depicts a back view of an exemplary embodiment of a detachable shaving light attached to a razor.

FIG. 8A depicts a front view of a detachable shaving light attached to a razor. The razor lights are positioned to the left and the right sides of the head of the razor. Some embodiments may include couplers that attach to the side of the head. Other embodiments may not include couplers for the light element. In some embodiments, the base may be attached to the razor by a hook and loop. The hook and loop may, for example, be a VELCRO™ product. (Velcro™ available from Grainger, Lake Forest, Illinois, USA). FIG. 8B depicts a back view opposite of the view of FIG. 8A.

Figure 9A:
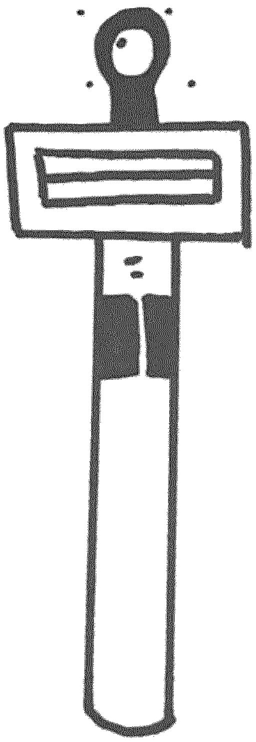
FIG. 9A depicts a front view of an exemplary embodiment of a detachable shaving light attached to a razor.
Figure 9B:
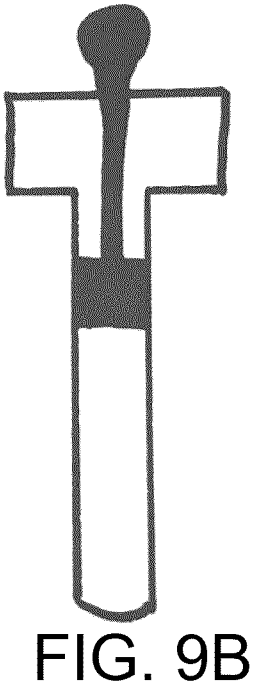
FIG. 9B depicts a back view of an exemplary embodiment of a detachable shaving light attached to a razor.

FIG. 9A is a front view of an exemplary embodiment of a detachable shaving light attached to a razor. The light source depicted is coupled to a base attached to a coupler attached to a stem of a razor. The base may, for example, include a cord. The cord may be used to position the light source freely. FIG. 9A is a back view of the exemplary detachable shaving light.

Figure 10A:
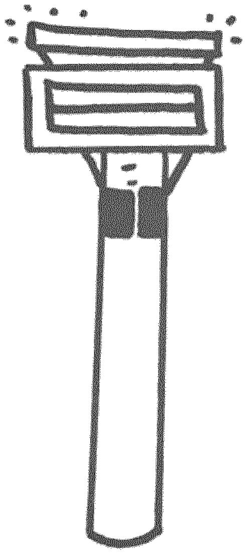
FIG. 10A depicts a front view of an exemplary embodiment of a detachable shaving light attached to a razor.
Figure 10B:
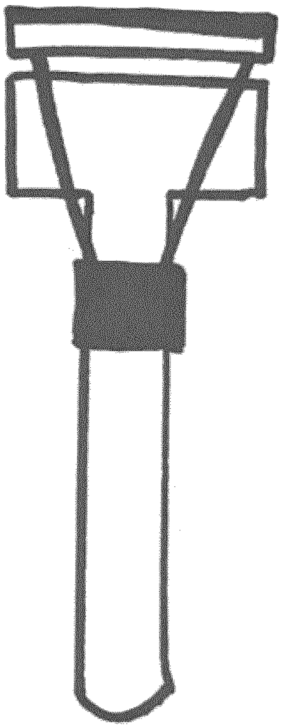
FIG. 10B depicts a back view of an exemplary embodiment of a detachable shaving light attached to a razor.

FIG. 10A depicts a front view of an exemplary embodiment of a detachable shaving light attached to a razor. The base may, for example, include a hinge at the coupler to a rigid base. The base may be flexible but use two base cords to attach to the light source. The use of one or more elements to the light source may, for example, provide more structural support than one base element attached to the light source. FIG. 10B depicts a back view of an exemplary embodiment of a detachable shaving light attached to a razor.

Figure 11:
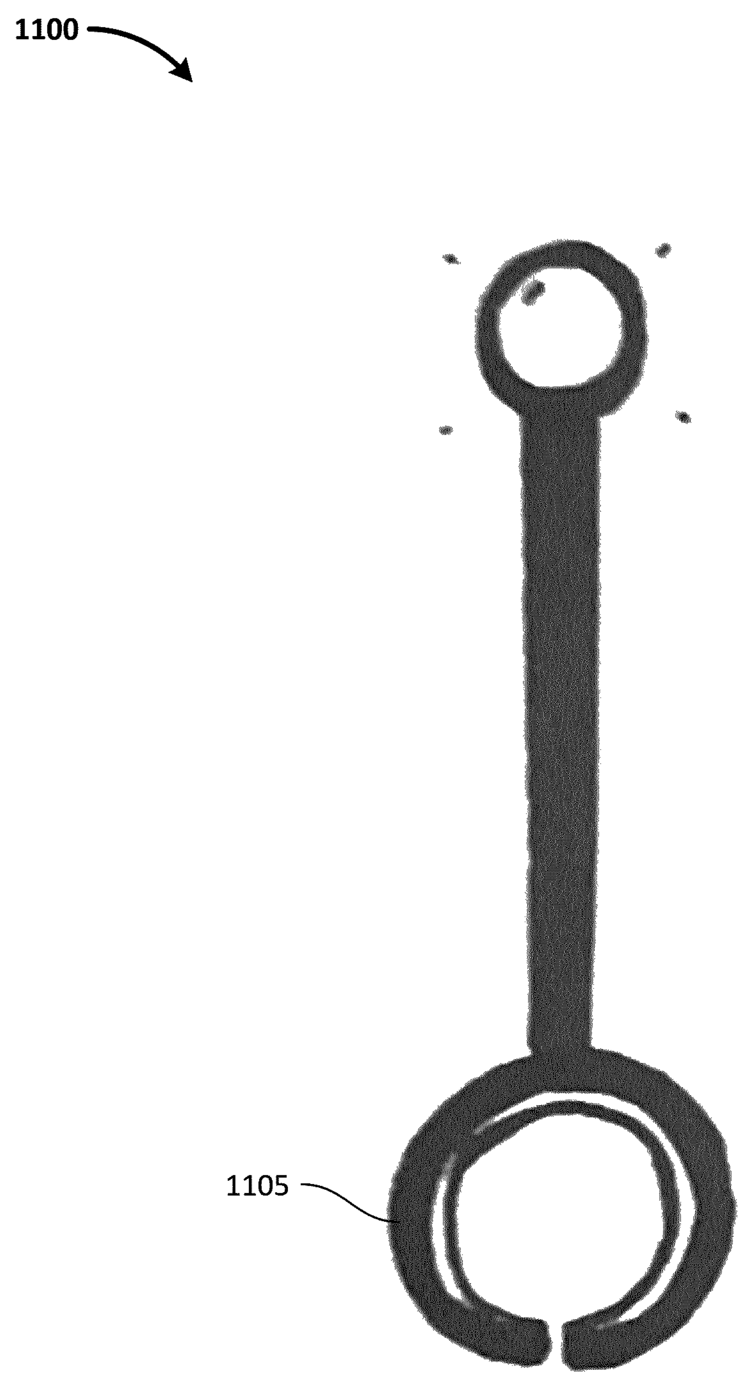
FIG. 11 depicts an exemplary embodiment with detachable shaving light couplers.

FIGS. 11-14 are exemplary embodiments of detachable shaving light couplers. FIG. 11 depicts an exemplary detachable shaving light 1100. The exemplary detachable shaving light 1100 includes a round coupler 1105. The position module may, for example, be referred to as a coupler. The light shaving module may, for example, be referred to as a base.

Figure 12:
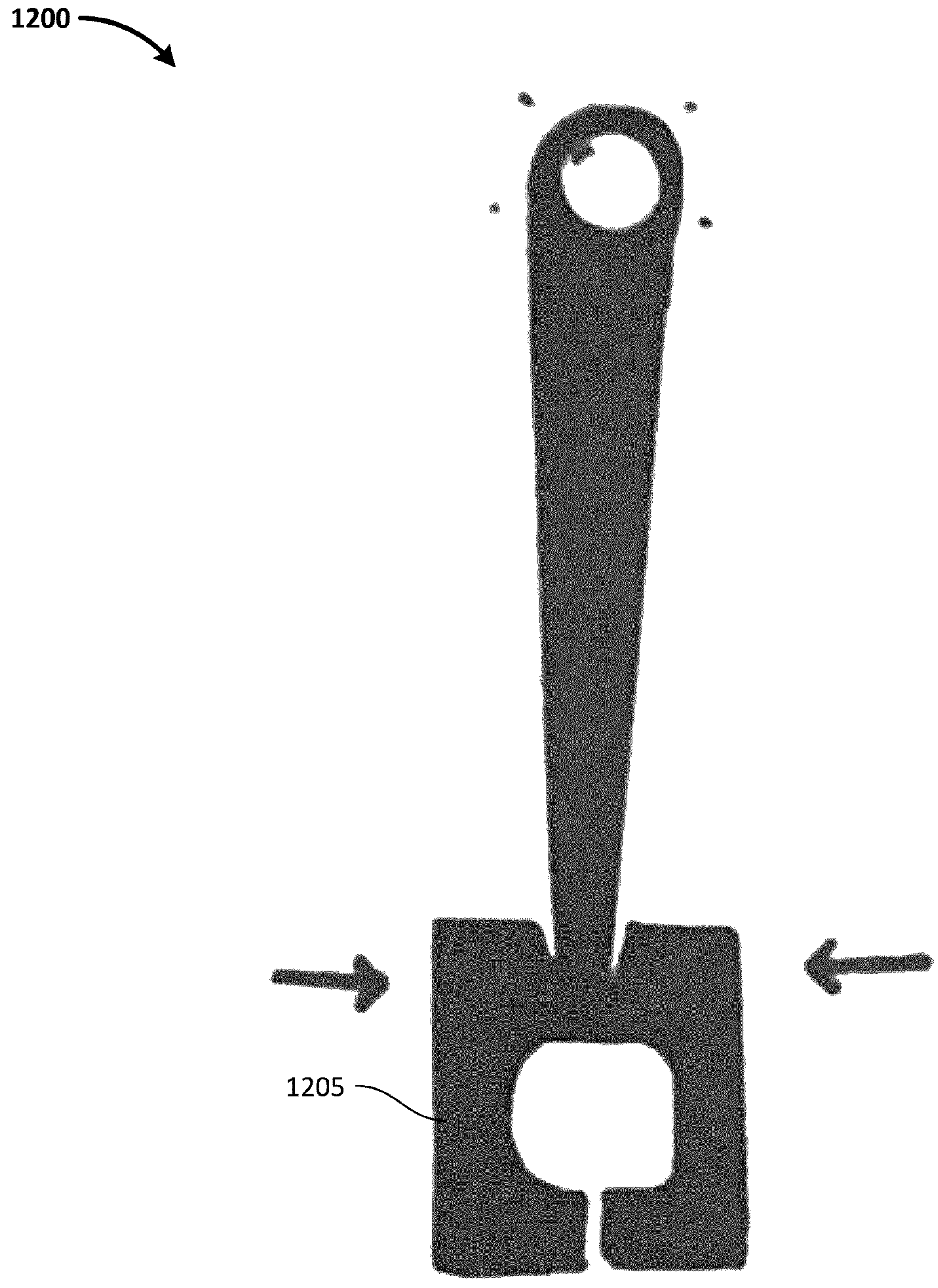
FIG. 12 depicts an exemplary embodiment of a detachable shaving light coupler.

FIG. 12 includes an exemplary detachable shaving light 1200. The exemplary detachable shaving light 1200 includes a square coupler 1205. Force may be applied to separate the clasps of the square coupler 1205. The square coupler is flexible so that after a force is applied the claps will become wider, allowing the coupler to at least partially encompass the razor. After the coupler has encompassed the razor, the coupler returns to its original length and position, creating a couple between the detachable shaving light and the razor. The detachable light razor coupler may, for example, include a texture that prevents the detachable light razor from slipping off the razor. The texture may, for example, create a larger coefficient of friction between the texture and the razor. The larger coefficient of friction may cause a larger amount of force for the detachable light to slide while coupled to the razor. The texture may, for example, be an embedded material such as a grit.

Figure 13:
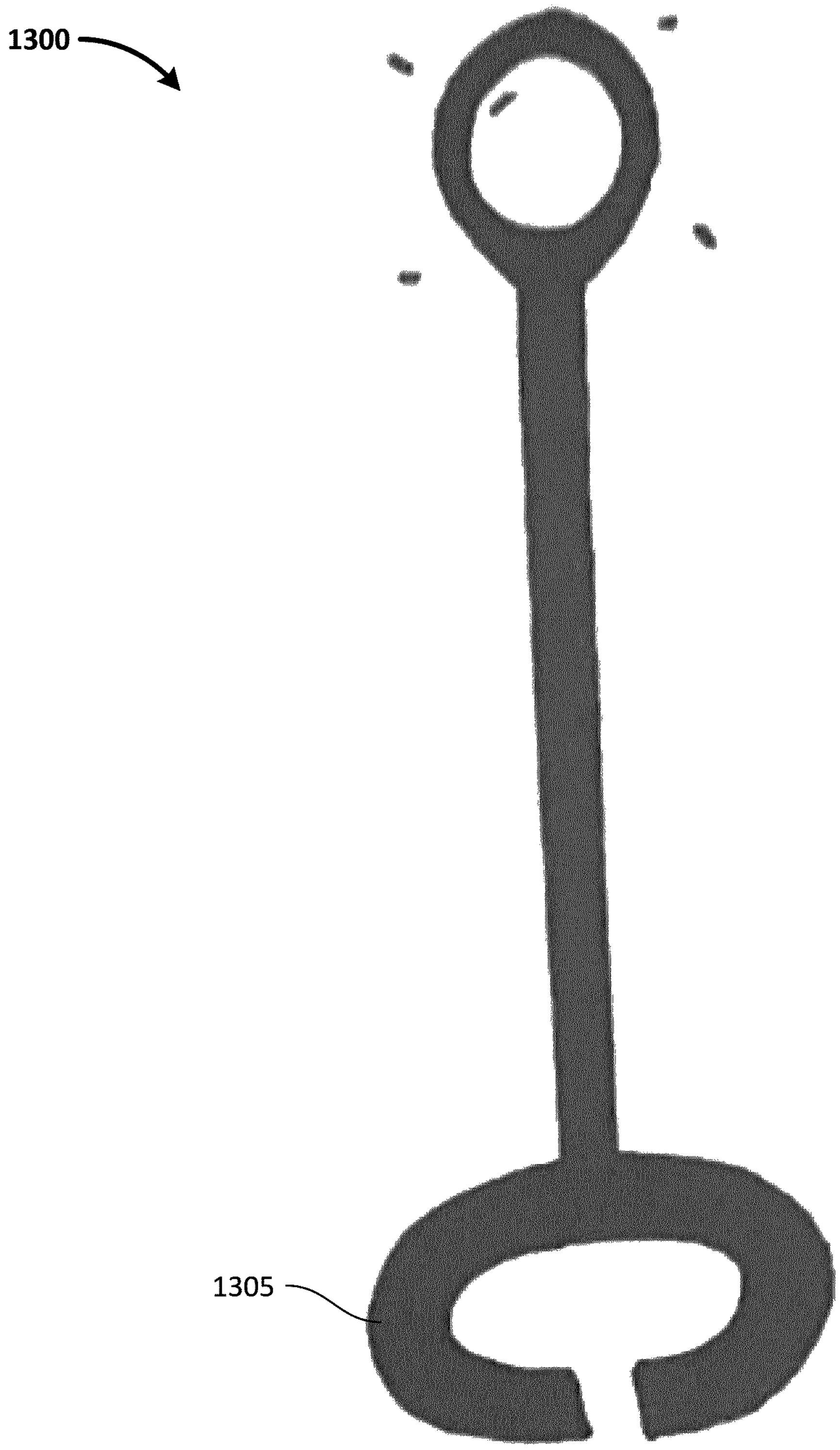
FIG. 13 depicts an exemplary embodiment of a detachable shaving light coupler.

FIG. 13 is an exemplary embodiment of a detachable shaving light 1300. The detachable shaving light includes a coupler 1305 that encompasses an aperture. The aperture may, for example, include an elliptical shape. The aperture may, for example, include a circular shape. The aperture may, for example, include an oval shape. The coupler may clasp onto a razor.

Figure 14:
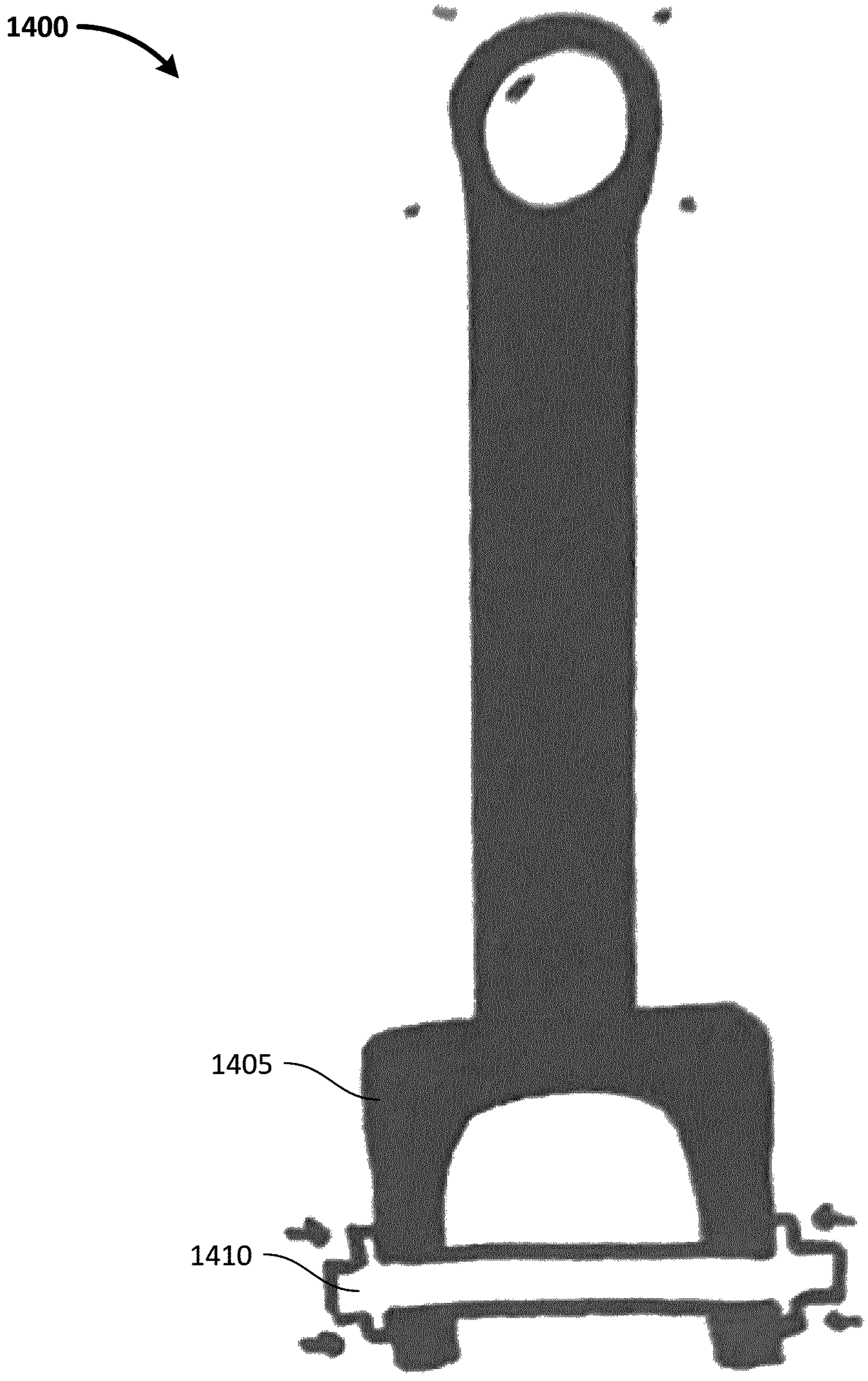
FIG. 14 depicts an exemplary embodiment of a detachable shaving light coupler.
Figure 15A:
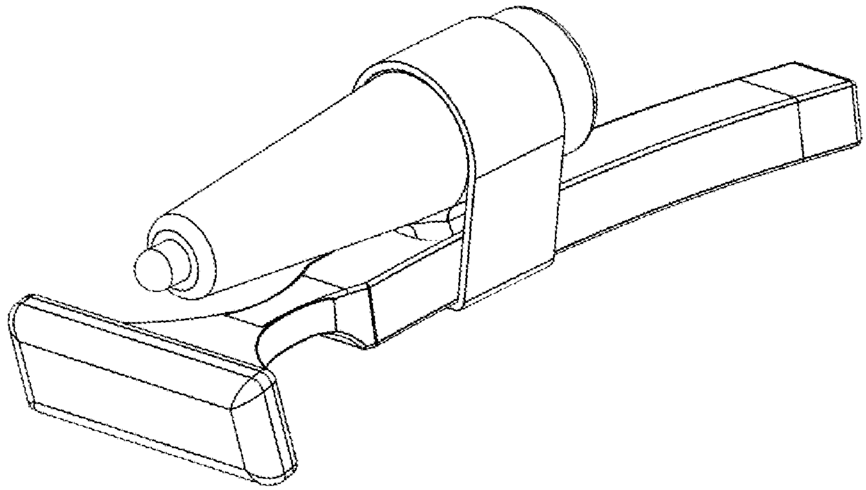
FIG. 15A depicts a front perspective view of an exemplary embodiment of a detachable shaving light releasably coupled to a razor.
Figure 15B:
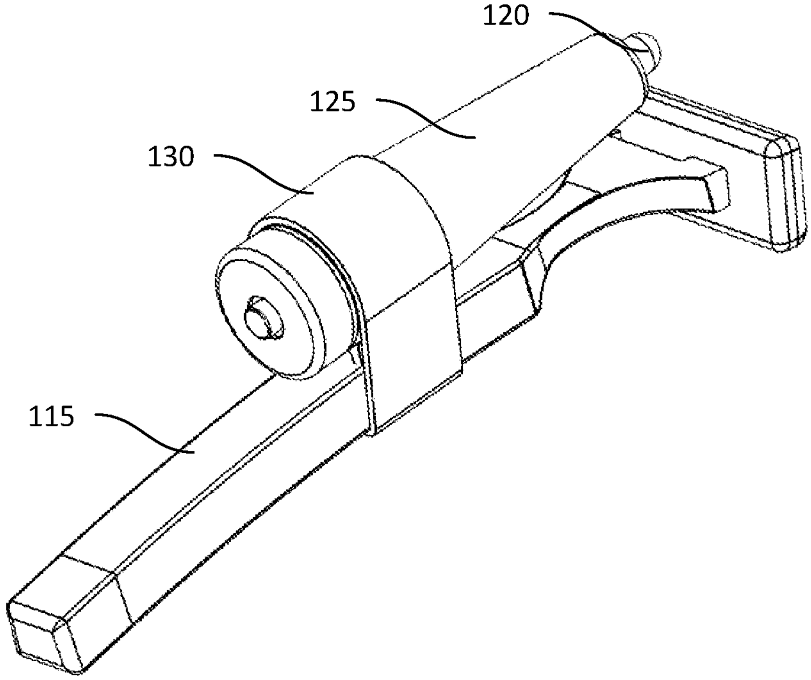
FIG. 15B depicts a back perspective view of an exemplary embodiment of a detachable shaving light releasably coupled to a razor.
Figure 15C:
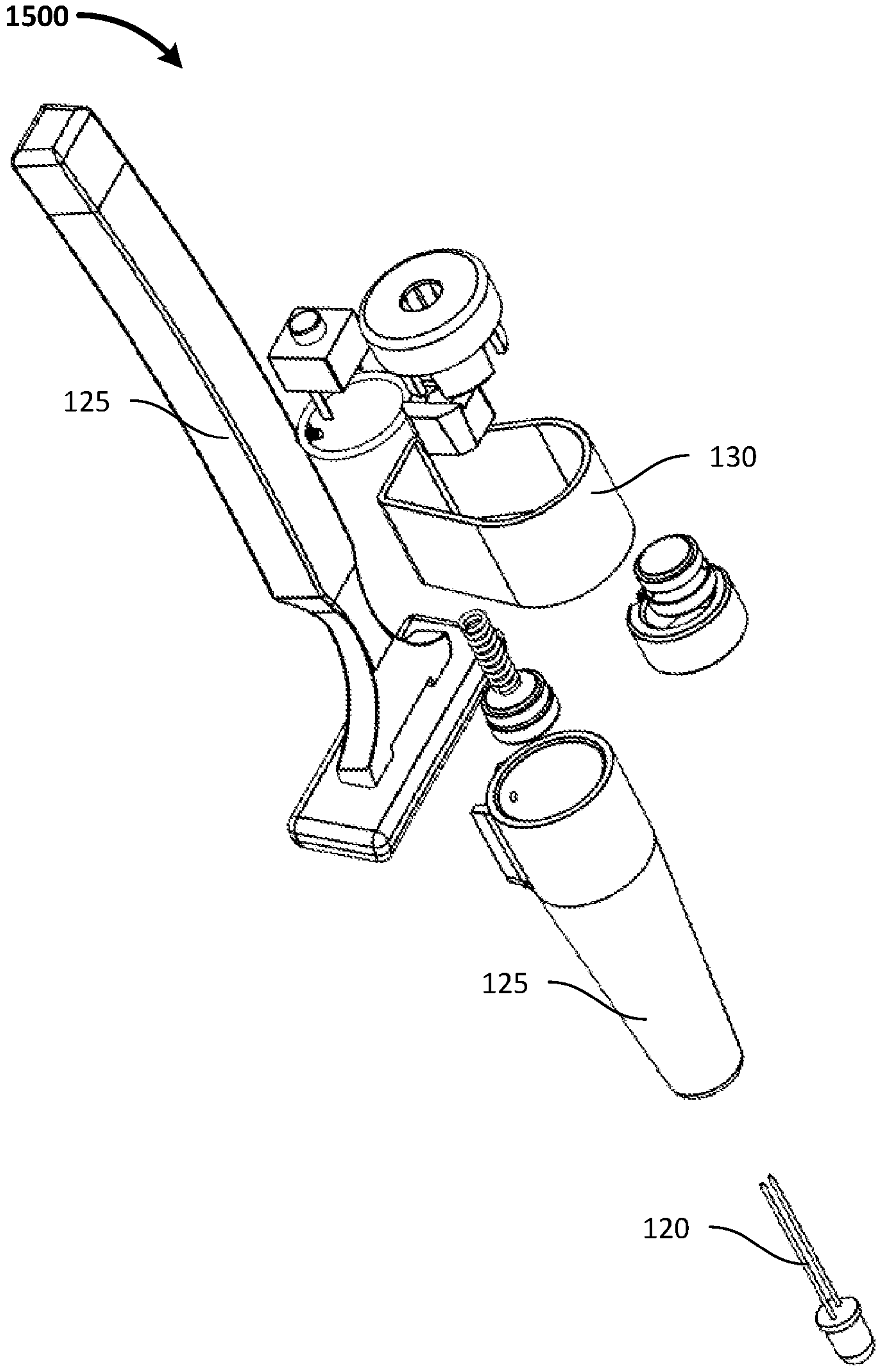
FIG. 15C depicts a back exploded view of an exemplary embodiment of a detachable shaving light releasably coupled to a razor.
Figure 15D:
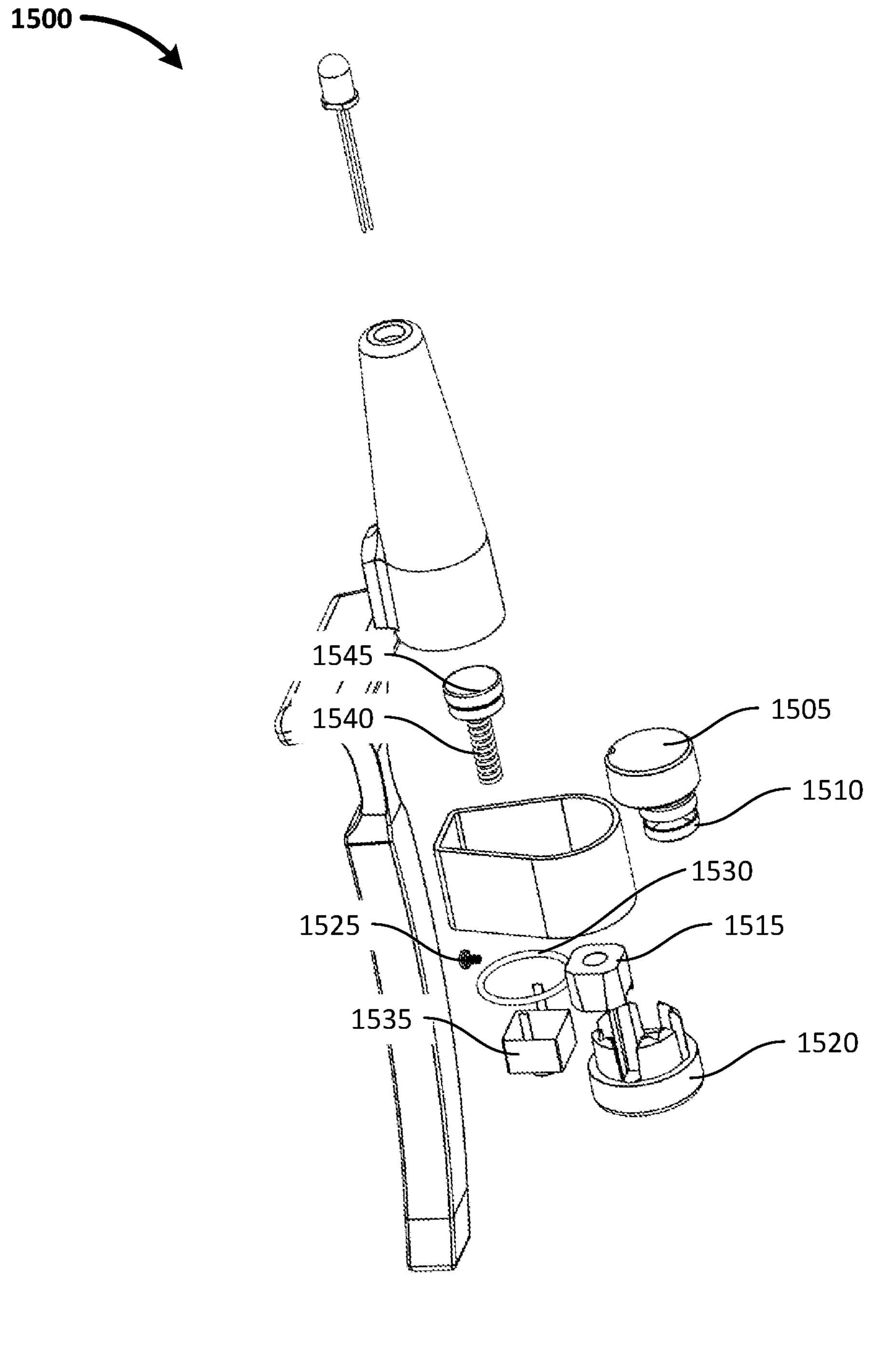
FIG. 15D depicts a front exploded view of an exemplary embodiment of a detachable shaving light releasably coupled to a razor.
Figure 15E:
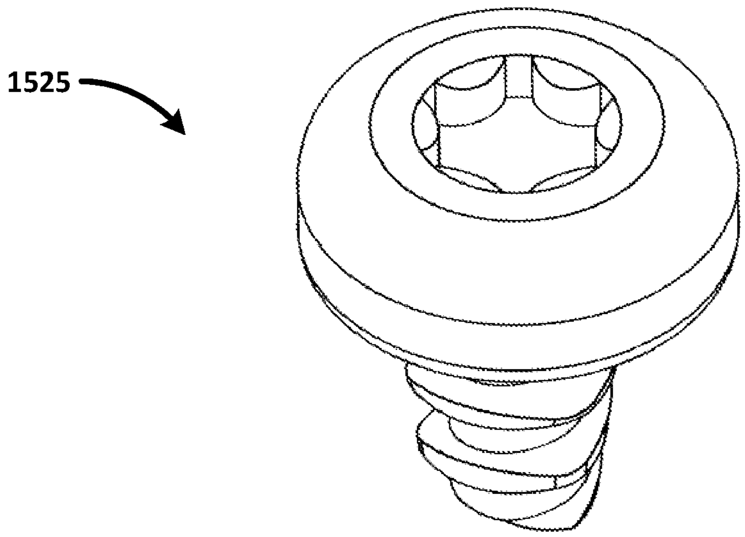
FIG. 15E depicts a front perspective view of an exemplary screw.
Figure 15F:
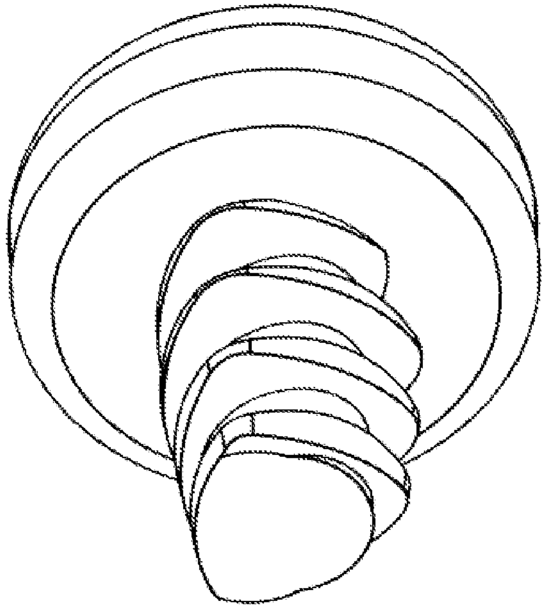
FIG. 15F depicts a back perspective view of an exemplary screw.
Figure 15G:
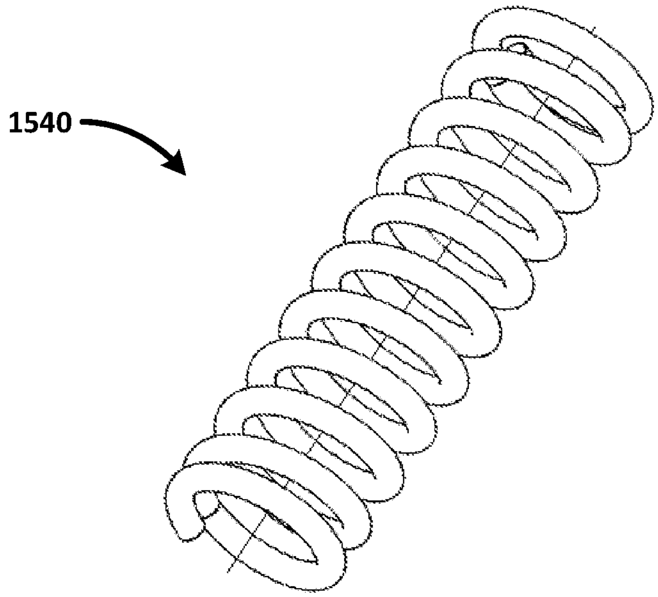
FIG. 15G depicts a perspective view of an exemplary compression spring.
Figure 15H:
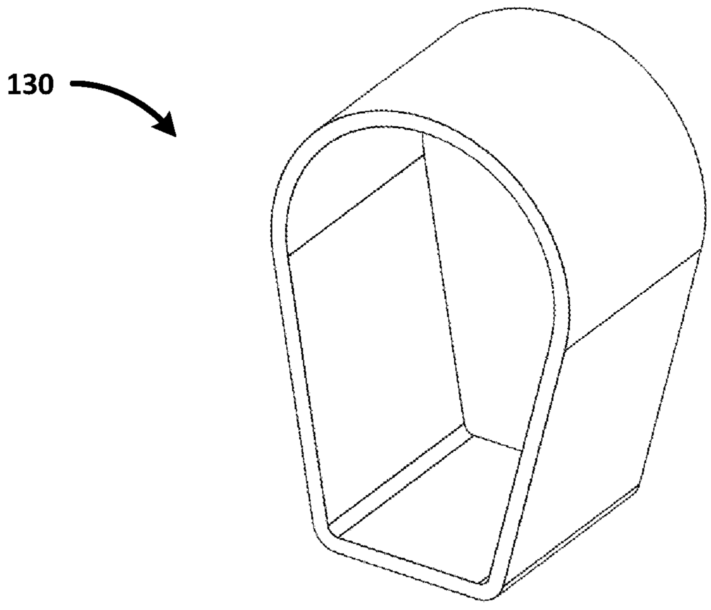
FIG. 15H depicts a perspective view of an exemplary position module.
Figure 15I:
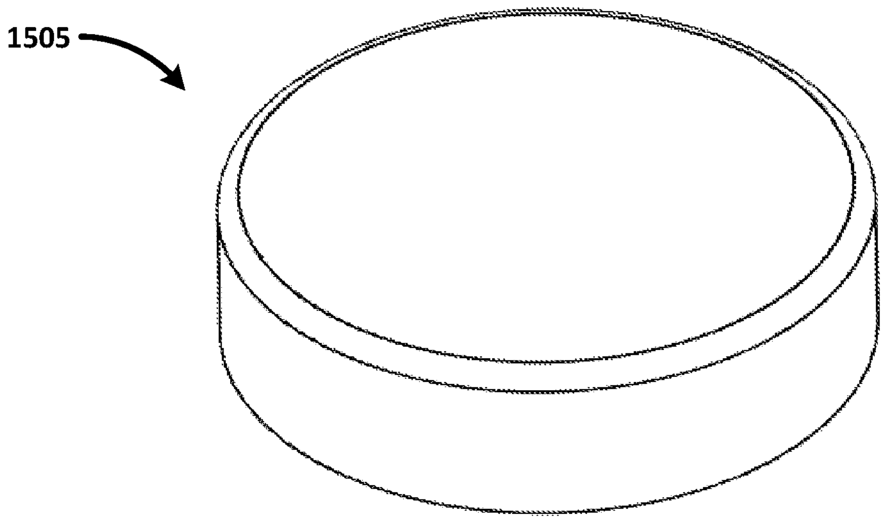
FIG. 15I depicts a top perspective view of an exemplary battery cap.
Figure 15J:
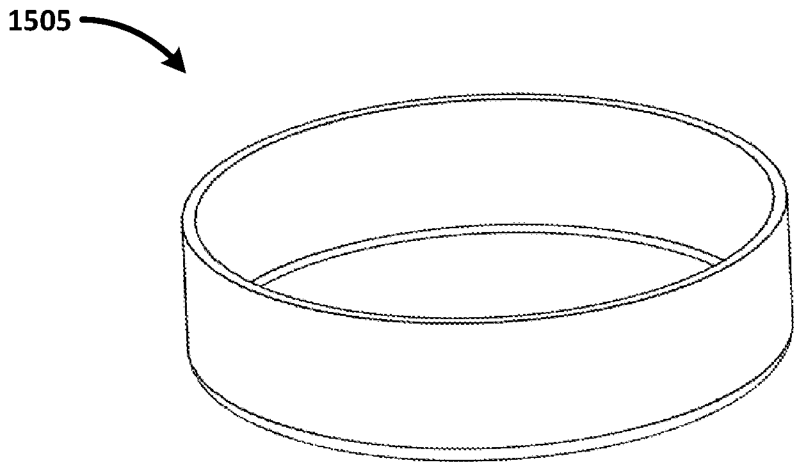
FIG. 15J depicts a bottom perspective view of an exemplary battery cap.
Figure 15K:
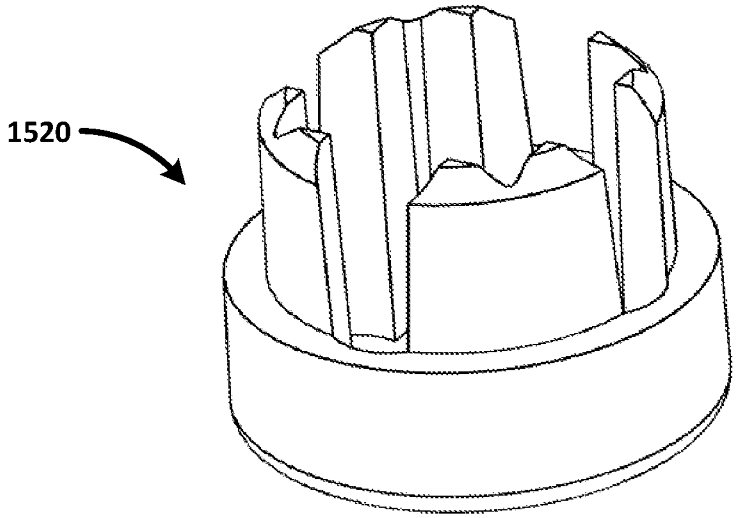
FIG. 15K depicts a top perspective view of an exemplary casing cap.
Figure 15L:
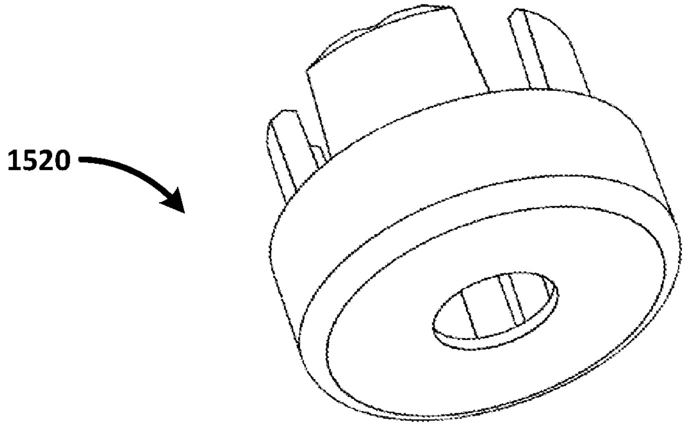
FIG. 15L depicts a bottom perspective view of an exemplary casing cap.
Figure 15M:
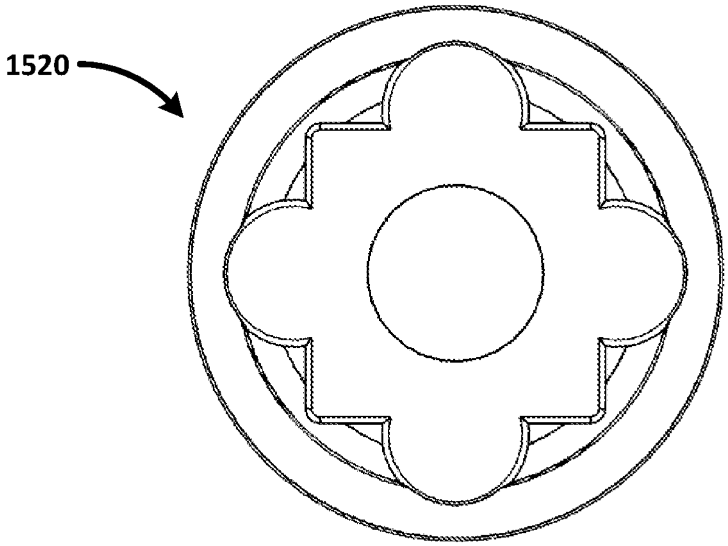
FIG. 15M depicts a top view of an exemplary casing cap.
Figure 15N:
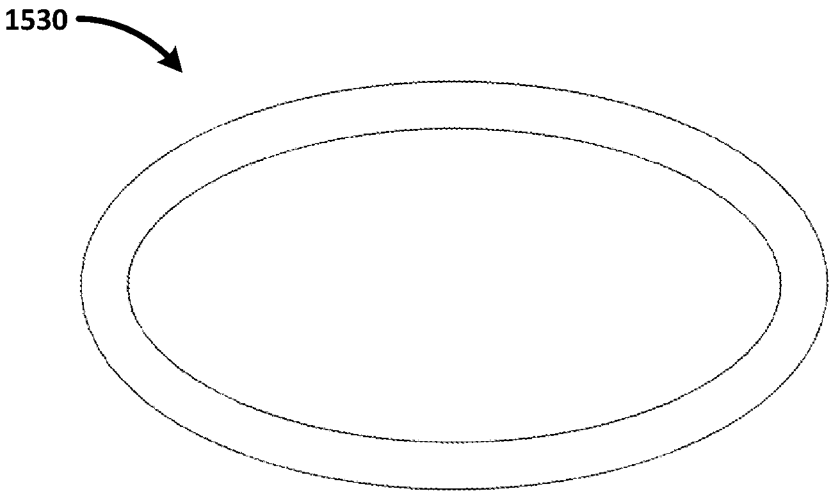
FIG. 15N depicts a perspective view of an exemplary ring.
Figure 15O:
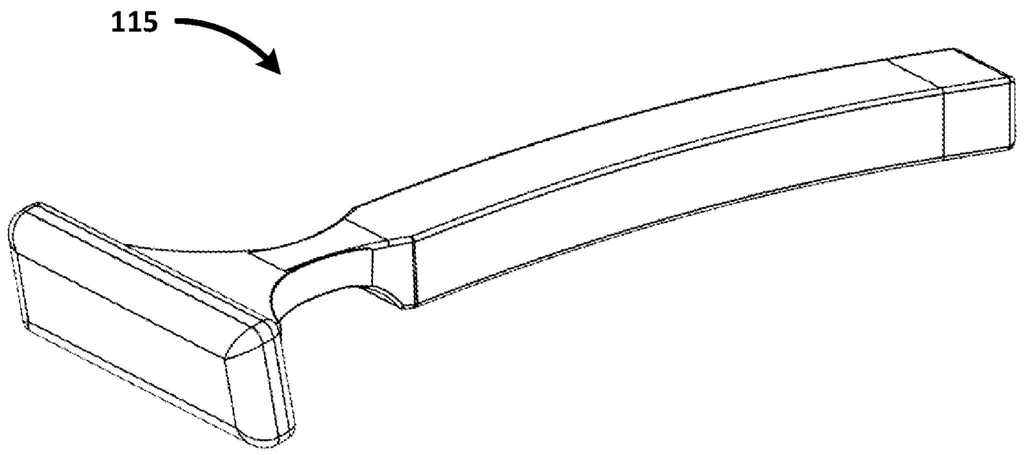
FIG. 15O depicts a perspective view of an exemplary razor.
Figure 15P:
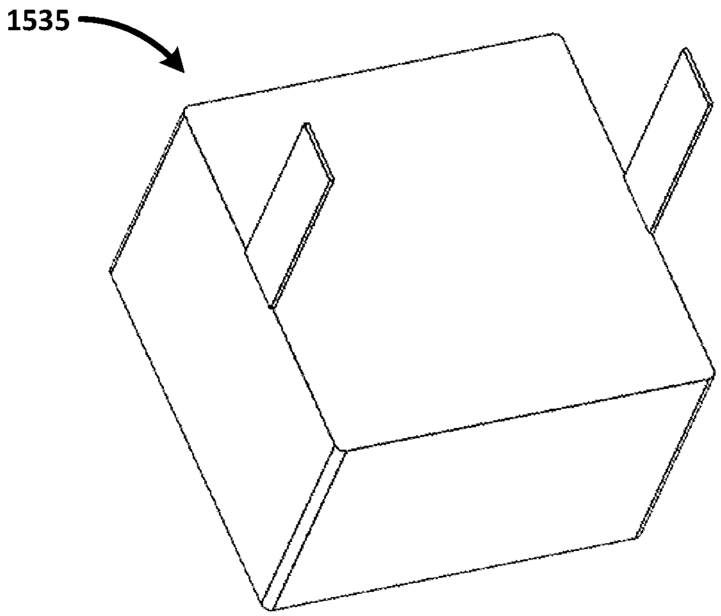
FIG. 15P depicts a bottom perspective view of an exemplary switch.
Figure 15Q:
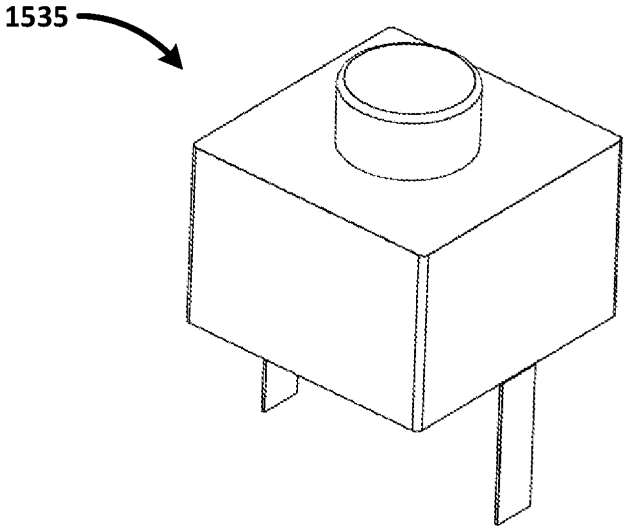
FIG. 15Q depicts a top perspective view of an exemplary switch.
Figure 15R:
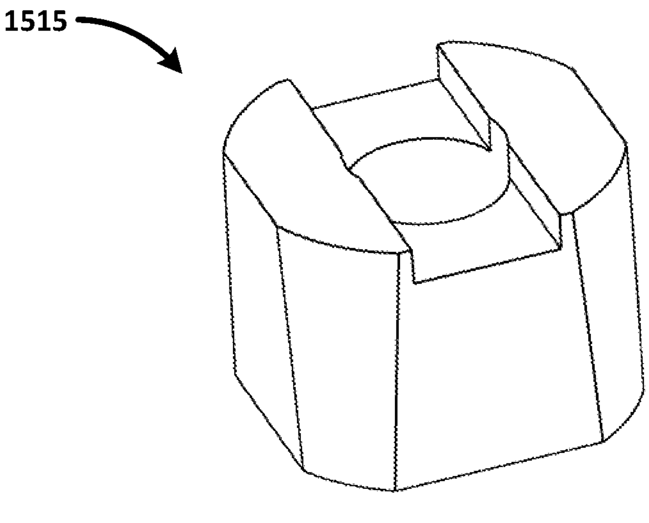
FIG. 15R depicts a top perspective view of an exemplary switch enclosure module.
Figure 15S:
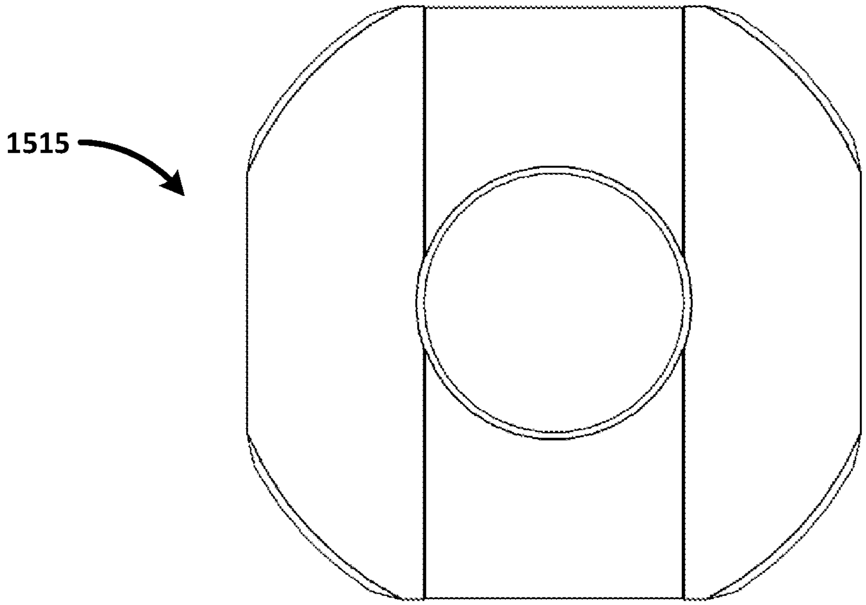
FIG. 15S depicts a top view of an exemplary switch enclosure module.
Figure 15T:
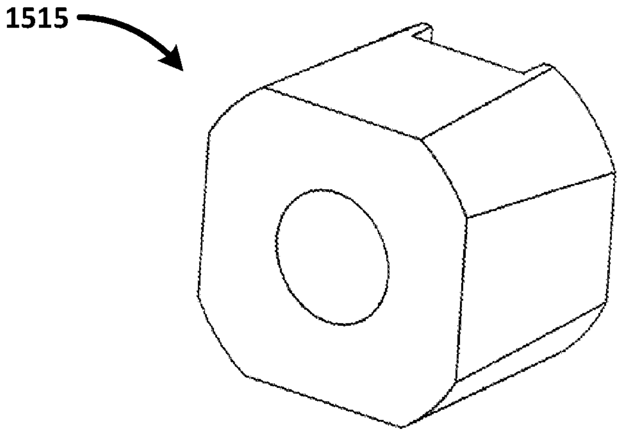
FIG. 15T depicts a bottom perspective view of an exemplary switch enclosure module.
Figure 16A:
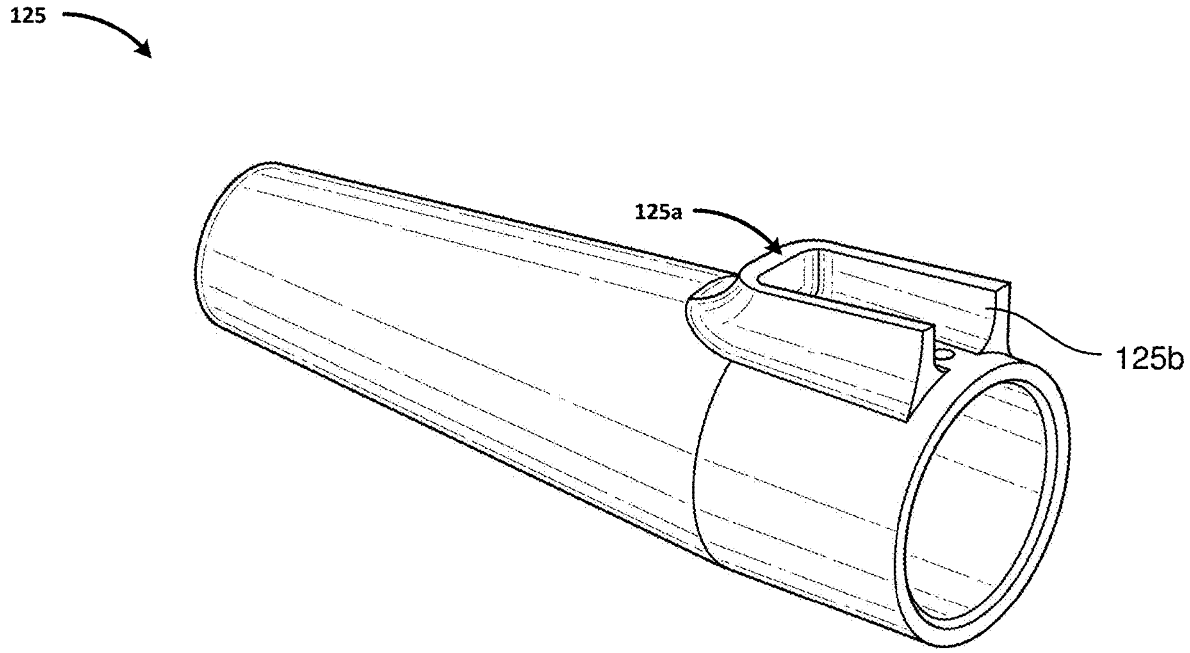
FIG. 16A depicts an exemplary perspective view of an exemplary light module housing.
Figure 16B:
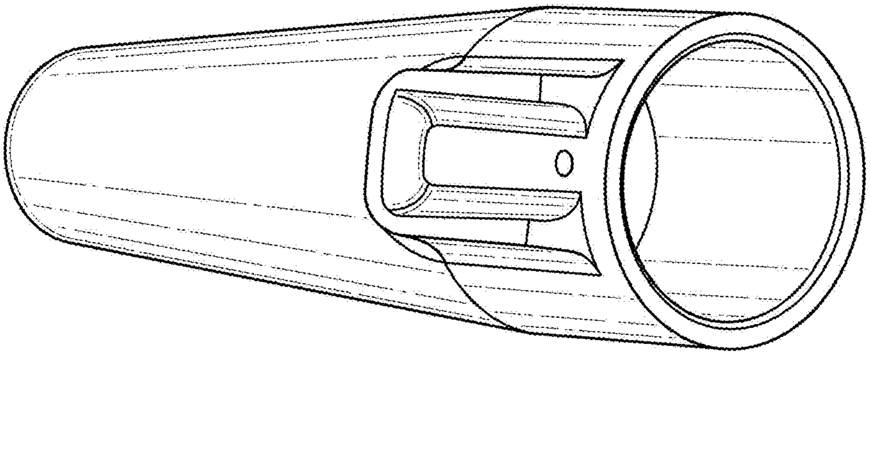
FIG. 16B depicts an exemplary perspective view of an exemplary light module housing.
Figure 16C:
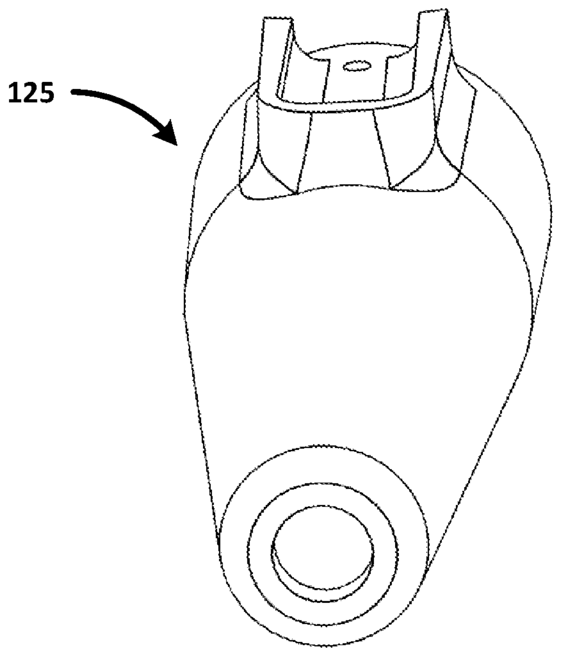
FIG. 16C depicts an exemplary perspective view of an exemplary light module housing.
Figure 16D:
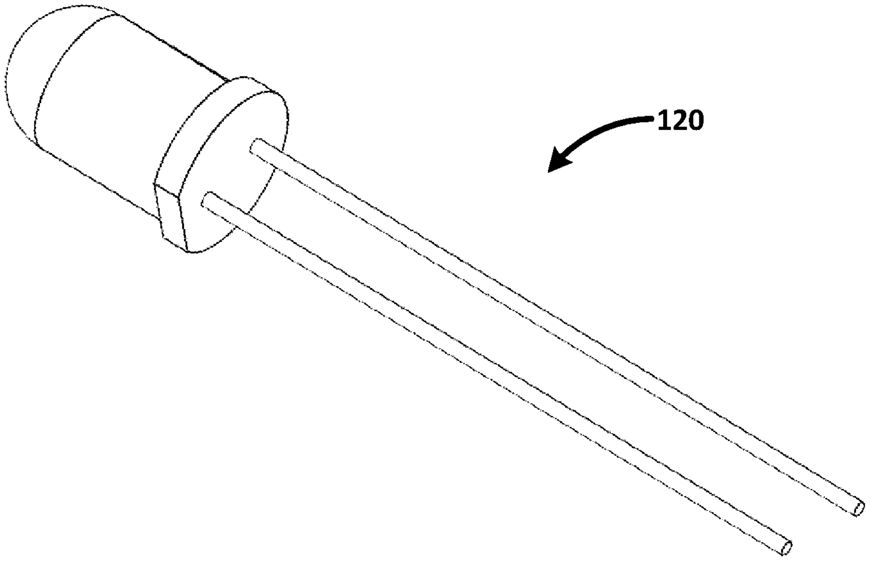
FIG. 16D depicts an exemplary perspective view of an exemplary light module.
Figure 16E:
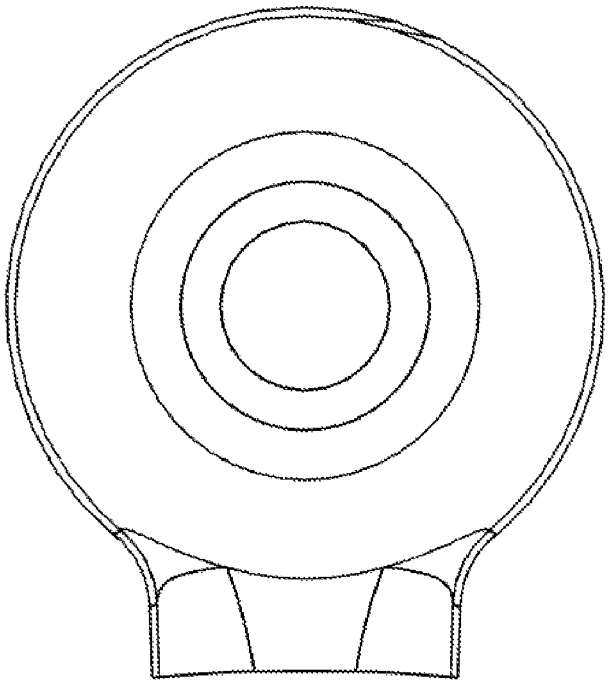
FIG. 16E depicts an exemplary front view of an exemplary light module housing.
Figure 16F:
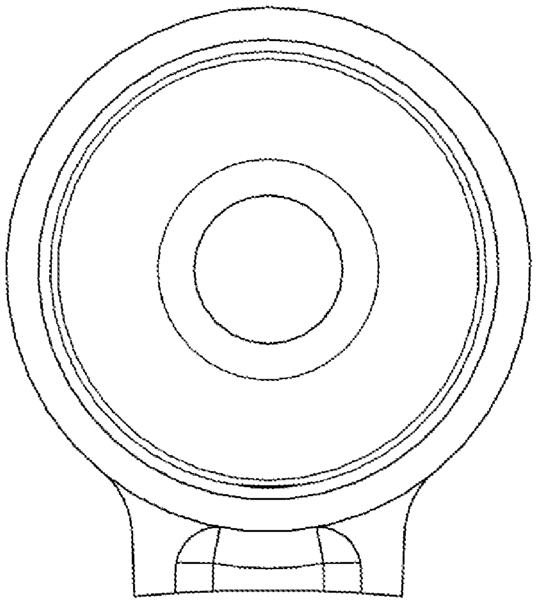
FIG. 16F depicts an exemplary back view of an exemplary light module housing.
Figure 16G:
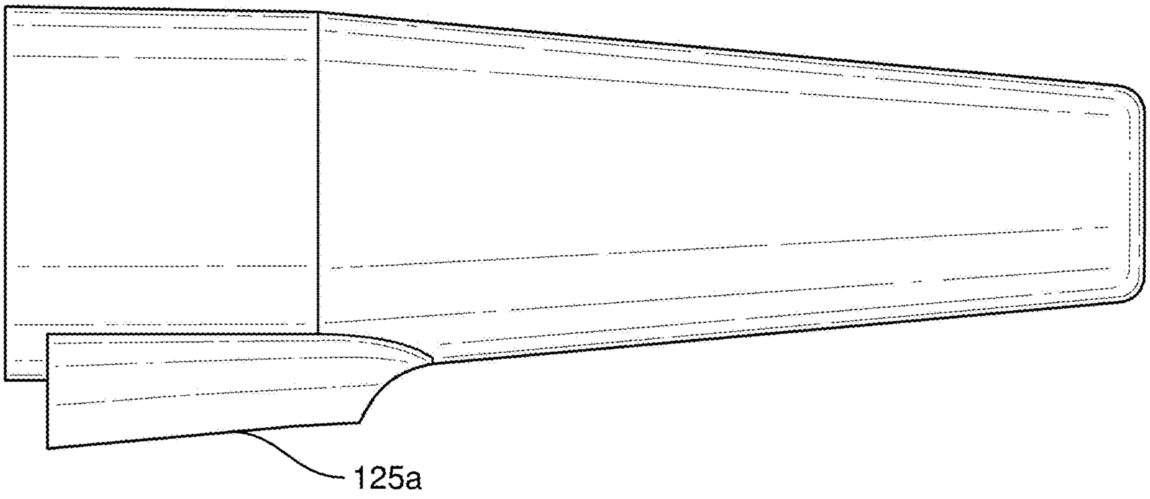
FIG. 16G depicts an exemplary side view of an exemplary light module housing.
Figure 16H:
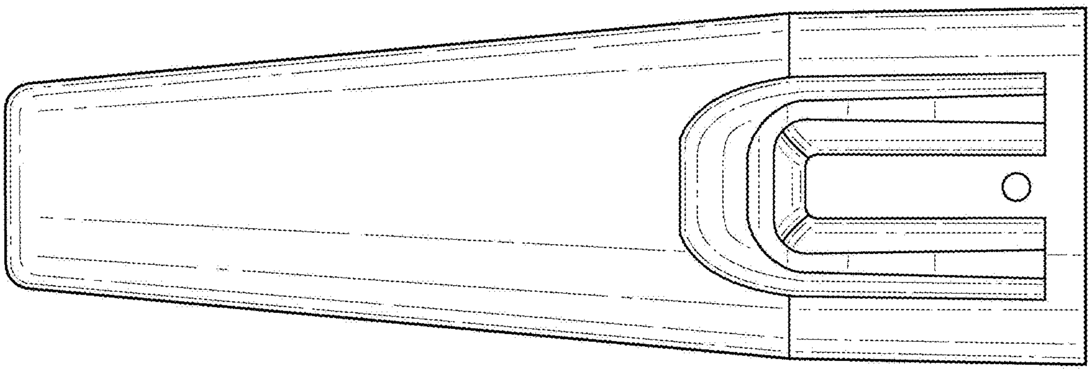
FIG. 16H depicts an exemplary side view of an exemplary light module housing.
Figure 17A:
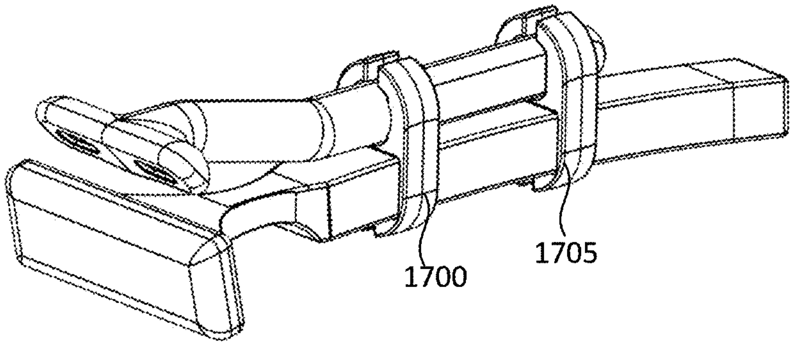
FIG. 17A depicts a front view of an exemplary detachable shaving light coupled to a razor.
Figure 17B:
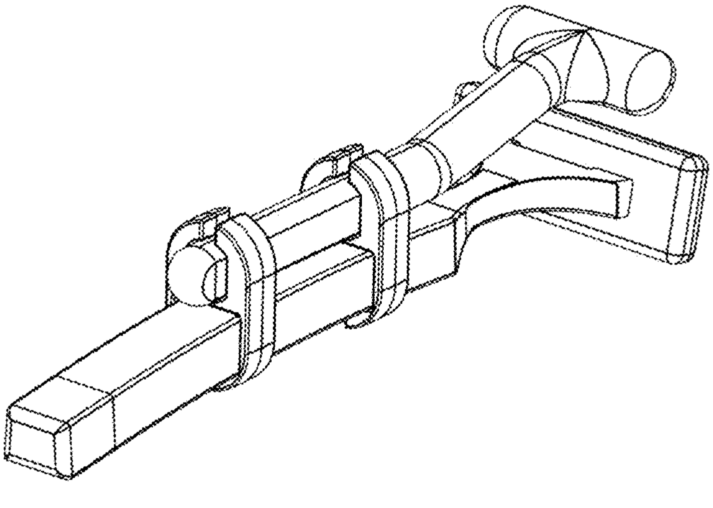
FIG. 17B depicts a back view of an exemplary detachable shaving light coupled to a razor.
Figure 17C:
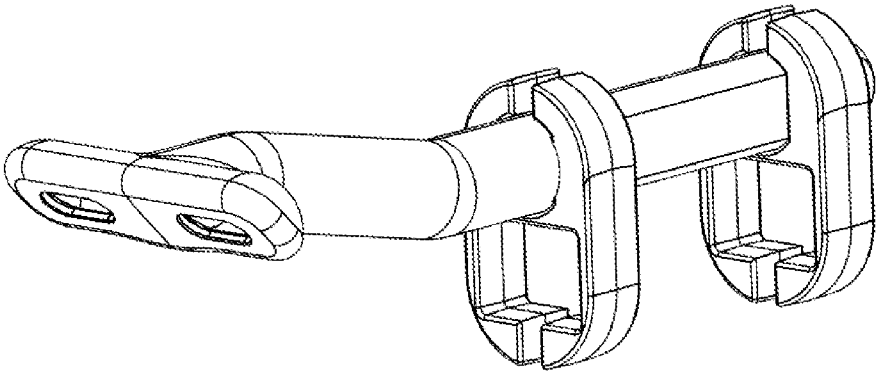
FIG. 17C depicts a front view of an exemplary detachable shaving light.
Figure 17D:
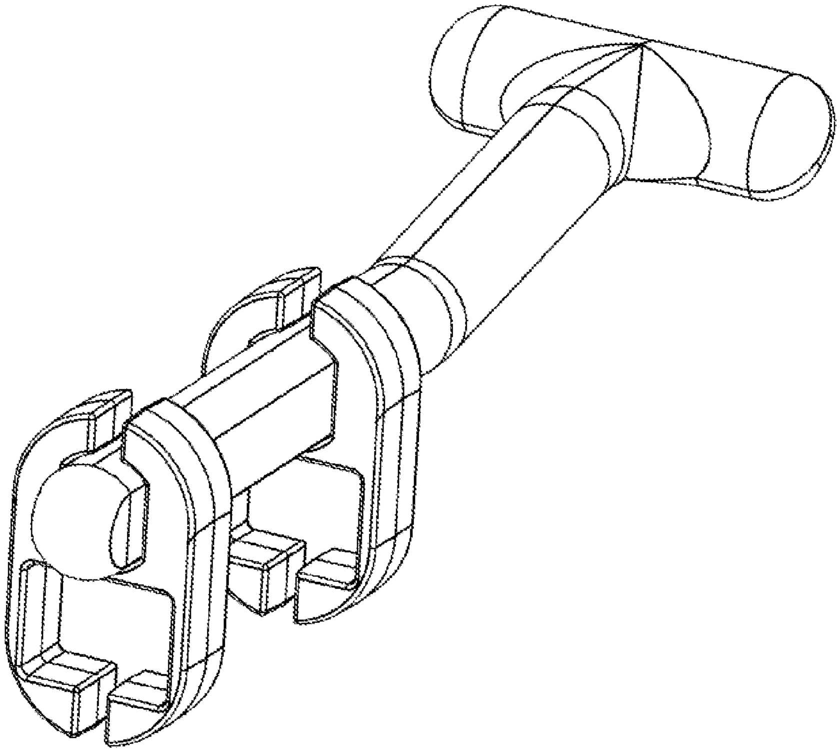
FIG. 17D depicts a front view of an exemplary detachable shaving light.

FIG. 14 is an exemplary embodiment of a detachable shaving light 1400. The detachable shaving light 1400 includes a two-part coupler. The detachable shaving light 1400 includes a curved fork 1405. The curved fork 1405 includes a band 1410. The curved fork may latch onto a razor. The band may attach to the top of the fork, such that, the detachable shaving light is coupled to the razor. The band may, for example, include an elastomer that creates a tension force when stretched pasted an original length. The band may, for example, include a lock mechanism that connects to the top of the fork. The band may, for example, bend the fork, such that the two prongs compress to apply force to the razor. The application of force may, for example, generate frictional forces that prevent sliding. The exterior of the fork may, for example, include grits to increase the coefficient of friction between the razor and the detachable light coupler.

FIGS. 15A-16H are views of an exemplary embodiment of a detachable shaving light 1500 coupled to a razor. In some embodiments, the position modules may partially encompass both the razor and the base of the detachable shaving light. At least one position module may, for example, be used to couple the light shaving module to the stem of the razor. Two position modules (a first positioning module 1700 and a second positioning module 1705) may, for example, attach the light shaving module of the detachable shaving light to the razor. (e.g., as depicted in FIGS. 17A-17D). The position modules may, for example, include clips. The position module may, for example, include rubber bands. The position modules may, for example, include different color embodiments. The position modules may, for example, be multi-colored.

In some embodiments, the light shaving modules may, for example, include multiple light sources. The lights sources may, for example, include LEDs. The lights sources may, for example, be powered by a battery. The battery may, for example, be a 1.5V button coin cell battery. There may be more than one battery used to power the detachable shaving light.

The detachable shaving light 1500 includes a first exemplary battery cap 1505. The detachable shaving light 1500 includes a second exemplary battery cap 1510. The detachable shaving light 1500 includes a toggle housing 1520. The detachable shaving light 1500 includes a screw 1525. The screw may, for example, be fastened to close the housing. The screw may, for example, be unfastened to open the housing. A user may, for example, open the housing to replace the battery.

The toggle housing 1520 couples to a switch holding mechanism 1515. The switch holding mechanism 1515 couples to an interface switch 1535. The detachable shaving light includes a spacer 1530. The spacer may, for example, include an O-ring. The detachable shaving light 1500 includes a compression spring 1540. The detachable shaving light 1500 includes a battery 1545. The compression spring may, for example, be released from a position of tension to electrically couple the battery to the light module, illuminating the light module. The compression spring may, for example, be compressed to decouple the electrical coupling of the battery of the light module, darkening the light module. The light module may, for example, include different modes. The modes may, for example, include an off position. The modes may, for example, include a low lumen position. The modes may, for example, include a medium lumen position. The modes may, for example, include a high lumen position.

In FIG. 16A-16D, a light shaving module 125 is depicted. The light shaving module includes a mounting surface. The mounting surface may, for example, include a convex curve relative to the longitudinal axis of the stem such that the outer edges of the mounting surface extend farthest from the light shaving module. The position module may, for example, extend outward from the light shaving module including the coupling module 125*b* that defines the angled mounting surface 125*a* that is oriented at an intersecting angle with a center optical axis of the light element.

FIGS. 17A-17D depict an exemplary detachable shaving light. In some embodiments, there may be one LED that is located outside the housing. Inside the housing, the LED may be connected to the batteries with flexible wires. In some embodiments, a PCB may be utilized. The batteries may be AJ7 batteries. A lockable latch switch on the back of the housing may be implemented to control the LED. The housing cap may be threaded or have a precise locational fit. The housing cap may also be secured via press fit or snap fit. The housing cap may be secured to the housing with screws. There may be a rubber O Ring between the housing and the cap. The device may attach to the razor via a flexible rubber belt. This rubber belt may stretch over the razor and be adjusted for best performance. Under the housing, there may be a spacer. The spacer may have four contact points to connect to the razor's surface. The surface of the LED may be perpendicular to the head of the razor so that the light casts outward. There may be an offset between the LED and the head of the razor. The device may be detachable from the entire razor, or it may just detach from the razor head.

In some embodiments, the light emitting module may, for example, include a latching switch. The switch may, for example, be assembled within the cup. The cup may, for example, be threaded. The light emitting module may, for example, include an O-ring to seal the light emitting module. The light emitting module may, for example, include a slidein screw set coupling module configuration from the bottom. The light emitting module may, for example, include a snap fit coupling module. The light emitting module may, for example, include a rubber belt coupling module. The position module may, for example, include spacers to hold off the razor to create a height to affect the angle of the light emission intersection with the surface of the razor and/or the axis of the face of the razor.

In some embodiments, the light shaving module may, for example, pivot by repositioning the light shaving module. A user may, for example, position the light element such that it does not protrude past the head of the razor. The distance may, for example, include 3 mm. The distance may, for example, be 2 mm. The distance may, for example, include 4 mm. The distance may, for example, include 2 inches. The distance may, for example, include 1 inch.

The coupling module may, for example, include 2 contact points at the base of the razor. The base may, for example, be cut in an opposite axis such that there are four points of contact on the razor handle, and even on a curve handle for example. The proximal direction may, for example, be located near the head of the razor. A distal direction may, for example, be located near the opposing end of the razor along the stem of the razor.

In some embodiments, the light module may, for example, be affixed to the base of the razor. In some embodiments, the light module may, for example, be affixed to the razor cartridge. In some embodiments, multiple light modules may, for example, be affixed to the light shaving module.

Although an exemplary system has been described with reference to FIGS. 1A-17D, other implementations may be deployed in other industrial, scientific, medical, commercial, and/or residential applications. The razor may, for example, be used in medical kits during surgery. For example, before applying a defibrillator to a chest of a patient, a user shave the chest of the patient. The detachable light coupler may, for example, be included in a kit that is used with defibrillators. The light may, for example, be advantageous to shave the chest of a patient when it is dark.

The razor may, for example, be included in shaving kits or beauty products. Sunbathers may, for example, find the razor helpful in finding stray hair when shaving to go out to the beach. The detachable light coupler may be used in beauty product kits because the extra light may help a user identify hair follicles that have not shaved after a first shave.

In various embodiments, some bypass circuits implementations may be controlled in response to signals from analog or digital components, which may be discrete, integrated, or a combination. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Temporary auxiliary energy inputs may be received, for example, from chargeable or single use batteries, which may enable use in portable or remote applications. Some embodiments may operate with other DC voltage sources, such as a 9V and/or 1.5V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other embodiments are contemplated within the scope of the following claims.

What is claimed is:

1. A detachable light shaving device comprising:

a light shaving module housing a light element;

a position module coupled to the light shaving module; and, a coupling module configured to releasably couple the light shaving module to a stem of a razor;

an angled mounting surface of the coupling module relative to the stem of the razor such that a central optical axis of the light element intersects a longitudinal axis of the stem of the razor forward of a head of the razor;

wherein the position module is configured such that the light element, positioned above the head of the razor, emits light along an optical axis intersecting the longitudinal axis of a stem of a razor such that, during a shaving operation, the light projects onto a shave surface beyond the head of the razor; and, wherein the coupling module extends outward from the light shaving module and defines the angled mounting surface.

2. The detachable light shaving device of claim 1, wherein the position module extends outward from the light shaving module and couples the razor to the angled mounting surface, the angled mounting surface having a convex curve relative to the longitudinal axis of the stem such that outer edges of the angled mounting surface extend farthest from the light shaving module.

3. The detachable light shaving device of claim 1, wherein the coupling is unitarily formed of a continuous material with the light shaving module.

4. The detachable light shaving device of claim 1, further comprising a second position module, wherein the position module claim 1 is a first position module configured to releasably couple the light shaving module along the stem of the razor proximal to the head of the razor, and the second position module is configured to releasably couple the light shaving module along the stem of the razor distal to the head of the razor.

5. The detachable light shaving device of claim 1, further in a system comprising a razor, wherein the mounting surface is coupled to a top side of the stem of the razor.

6. The detachable light shaving device of claim 1, further in a system comprising a razor, wherein the mounting surface is coupled to a bottom side of the stem of the razor.

7. The detachable light shaving device of claim 1, further comprising:

an interface switch; and a battery electrically coupled to the light element through interface switch, such that when the interface switch is actuated electrical current flows from the battery into the light element, illuminating the light element.

8. The detachable light shaving device of claim 7, wherein the interface switch further comprises a compression spring, wherein the interface switch is actuated by compressing the compression spring.

9. A detachable light shaving device comprising:

a light shaving module housing a light element; and a position module coupled to the light shaving module; and, a coupling module configured to releasably couple the light shaving module to a stem of a razor;

an angled mounting surface of the coupling module relative to the stem of the razor such that a central optical axis of the light element intersects a longitudinal axis of the stem of the razor forward of a head of the razor;

wherein the position module is configured such that the light element, positioned above the head of the razor, emits light along an optical axis intersecting the longitudinal axis of a stem of a razor such that, during a shaving operation, the light projects onto a shave surface beyond the head of the razor;

wherein the coupling module extends outward from the light shaving module and defines the angled mounting surface; and, wherein the position module extends outward from the light shaving module and couples the razor to the angled mounting surface, the angled mounting surface having a convex curve relative to the longitudinal axis of the stem such that outer edges of the angled mounting surface extend farthest from the light shaving module.

10. The detachable light shaving device of claim 9, wherein the coupling module is unitarily formed of a continuous material with the light shaving module.

11. The detachable light shaving device of claim 9, further comprising a second position module, wherein the position module claim 9 is a first position module configured to releasably couple the light shaving module along the stem of the razor proximal to the head of the razor, and the second position module is configured to releasably couple the light shaving module along the stem of the razor distal to the head of the razor.

12. The detachable light shaving device of claim 9, further in a system comprising a razor, wherein a mounting surface is coupled to a top side of the stem of the razor.

13. The detachable light shaving device of claim 9, further in a system comprising a razor, wherein a mounting surface is coupled to a bottom side of the stem of the razor.

14. The detachable light shaving device of claim 9, further comprising:

an interface switch; and a battery electrically coupled to the light element through the interface switch, such that when the interface switch is actuated electrical current flows from the battery into the light element, illuminating the light element.

15. The detachable light shaving device of claim 14, wherein the battery is replaceable.

16. The detachable light shaving device of claim 14, wherein interface switch further comprises a compression spring that is actuated by compressing the compression spring.

17. The detachable light shaving device of claim 14, wherein the interface switch is actuated by a computer processing unit directing electrical current to flow into the light element, illuminating the light element.

* * * * *